(12) United States Patent
Harale et al.

(10) Patent No.: US 12,723,683 B2
(45) Date of Patent: Sep. 1, 2026

(54) ADAPTER TO CONNECT METAL AND CERAMIC COMPONENTS AND RELATED SYSTEMS

(71) Applicants: Saudi Arabian Oil Company, Dhahran (SA); CoorsTek Membrane Sciences AS, Oslo (NO)

(72) Inventors: Aadesh Harale, Dhahran (SA); Aqil Jamal, Dhahran (SA); Stephen N. Paglieri, Dhahran (SA); Selene Hernandez Morejudo, Oslo (NO); Xin Liu, Oslo (NO); Per Vestre, Oslo (NO); Michael Ian Budd, Sandefjord (NO)

(73) Assignees: Saudi Arabian Oil Company, Dhahran (SA); CoorsTek Membrane Sciences AS, Oslo (NO)

( * ) Notice: Subject to any disclaimer, the term of this patent is extended or adjusted under 35 U.S.C. 154(b) by 116 days.

(21) Appl. No.: 18/609,548

(22) Filed: Mar. 19, 2024

(65) Prior Publication Data

US 2025/0207707 A1 Jun. 26, 2025

Related U.S. Application Data

(63) Continuation-in-part of application No. 18/392,709, filed on Dec. 21, 2023.

(51) Int. Cl.
*F16L 13/007* (2006.01)
*C04B 37/02* (2006.01)
(Continued)

(52) U.S. Cl.
CPC ......... *F16L 13/007* (2013.01); *F16L 25/0072* (2013.01); *F16L 41/02* (2013.01); *F16L 49/02* (2013.01)

(58) Field of Classification Search
CPC ......... F16L 49/02; F16L 41/02; F16L 13/007; F16L 25/0072; C04B 2237/10;
(Continued)

(56) References Cited

U.S. PATENT DOCUMENTS 2,434,555 A * 1/1948 Fischer ................ C04B 41/009 228/122.1
D276,624 S 12/1984 Feinbloom
(Continued)

FOREIGN PATENT DOCUMENTS

CN 101386977 4/2011
CN 107683384 A * 2/2018 .......... C04B 37/005
(Continued)

OTHER PUBLICATIONS

Chen et al., "On the assembling of Pd/ceramic composite membranes for hydrogen separation," Separation and Purification Technology, Mar. 2010, 72(1):92-97, 6 pages.
(Continued)

*Primary Examiner* — James M Hewitt, II
(74) *Attorney, Agent, or Firm* — Fish & Richardson P.C.

(57) ABSTRACT

The disclosure relates to adapters, systems, and methods to connect a metal component and a ceramic component. The systems and methods generally include a metal header, a header seal and a zirconia toughened alumina (ZTA) header. The adapters, systems, and methods can further include a glaze and/or a palladium (Pd) or Pd-alloy coated membrane deposited on the ceramic component.

6 Claims, 26 Drawing Sheets

(51) Int. Cl.

| | |
|---|---|
| ***F16L 25/00*** | (2006.01) |
| ***F16L 41/02*** | (2006.01) |
| ***F16L 49/02*** | (2006.01) |

(58) Field of Classification Search

CPC ........ C04B 2237/348; C04B 2237/765; C04B 37/025; C04B 2237/84; C01B 2203/041; C01B 3/505

See application file for complete search history.

(56) References Cited

U.S. PATENT DOCUMENTS

| | | | |
|---|---|---|---|
| 4,588,402 A | 5/1986 | Igari et al. | |
| D291,482 S | 8/1987 | Vassallo et al. | |
| D387,146 S | 12/1997 | Morrison | |
| D444,237 S | 6/2001 | Stone | |
| D454,623 S | 3/2002 | Sato et al. | |
| D462,112 S | 8/2002 | Kozu et al. | |
| 6,532,769 B1 | 3/2003 | Meinhardt et al. | |
| D483,096 S | 12/2003 | Gotoh et al. | |
| D583,026 S | 12/2008 | Dirneder | |
| D594,938 S | 6/2009 | Dirneder | |
| D623,277 S | 9/2010 | Guzzoni et al. | |
| D638,104 S | 5/2011 | Govoni et al. | |
| 8,119,205 B2 | 2/2012 | Roa et al. | |
| D676,940 S | 2/2013 | Kluss et al. | |
| 8,753,433 B2 | 6/2014 | Haring et al. | |
| 8,992,852 B2 * | 3/2015 | His ........................ | C10G 9/203 422/240 |
| 8,999,870 B2 | 4/2015 | Goedeke et al. | |
| D730,495 S | 5/2015 | Umehara | |
| 9,156,007 B2 | 10/2015 | Correia et al. | |
| 9,409,814 B2 | 8/2016 | Takayama | |
| D773,621 S | 12/2016 | Gill | |
| 9,522,842 B2 | 12/2016 | Nonnet et al. | |
| 9,969,645 B2 | 5/2018 | Gonzalez et al. | |
| D834,154 S | 11/2018 | Khubani | |
| D867,576 S | 11/2019 | Hewitt | |
| D886,994 S | 6/2020 | Lundkvist et al. | |
| D919,060 S | 5/2021 | Fife et al. | |
| D952,805 S | 5/2022 | Lin | |
| D959,379 S | 8/2022 | He et al. | |
| D994,092 S | 8/2023 | Liao | |
| D1,007,471 S | 12/2023 | Bigeh | |
| 11,867,032 B1 | 1/2024 | Parks et al. | |
| D1,022,149 S | 4/2024 | Mccutcheon | |
| D1,103,116 S | 11/2025 | Mcpheat | |
| 2019/0002337 A1 | 1/2019 | Kelley et al. | |
| 2021/0139366 A1 | 5/2021 | Budd | |
| 2024/0426393 A1 | 12/2024 | Dobaisi et al. | |
| 2025/0207698 A1 | 6/2025 | Harale et al. | |

FOREIGN PATENT DOCUMENTS

| | | |
|---|---|---|
| CN | 114906810 A | 8/2022 |
| CN | 115745661 A | 3/2023 |
| EP | 1547673 | 6/2005 |
| JP | H 01138088 A | 5/1989 |
| JP | 3933907 B2 | 6/2007 |
| JP | 5751357 B1 | 7/2015 |
| JP | 5904536 B2 | 4/2016 |
| JP | 6354968 B2 | 7/2018 |
| WO | WO 2014049119 | 4/2014 |

OTHER PUBLICATIONS

Fernandez et al., "Development of thin Pd-Ag supported membranes for fluidized bed membrane reactors including WGS related gases," International Journal of Hydrogen Energy, 2015, 40(8):3506-3519, 14 pages.

U.S. Appl. No. 29/922,317, Harale et al., Tubular Union, filed Dec. 21, 2023, 39 pages.

U.S. Appl. No. 29/933,303, Harale et al., Tubular Union, filed Mar. 19, 2024, 44 pages.

* cited by examiner 1500
1120
1100
1250
1350
1300

ADAPTER TO CONNECT METAL AND CERAMIC COMPONENTS AND RELATED SYSTEMS

CROSS-REFERENCE TO RELATED APPLICATION

This application claims priority under 35 U.S.C. § 120 to, and is a continuation-in-part of, U.S. patent application Ser. No. 18/392,709, filed on Dec. 21, 2023. The entire contents of the prior application are hereby incorporated by reference herein.

FIELD

The disclosure relates to adapters, systems, and methods to connect a metal component and a ceramic component. The systems and methods generally include a metal header, a header seal and a zirconia toughened alumina (ZTA) header. The adapters, systems, and methods can further include a glaze and/or a palladium (Pd) or Pd-alloy coated membrane deposited on the ceramic component.

BACKGROUND

Stress generated by differences in thermal expansion behavior of the materials in connections between a metal component (e.g., a metal connector) and a ceramic component (e.g., a ceramic-supported membrane component) can lead to fracturing, cracking, and loss of hermeticity. A common material for the porous ceramic support for palladium or palladium alloy membranes is alumina. Ferritic steels, which generally have a lower coefficient of thermal expansion (CTE) than most other steels, still have a CTE that is much higher than that of alumina. Consequently, if a ferritic steel is bonded directly to alumina at a relatively high temperature, relatively high levels of stress can be generated in the joint on cooling from the sealing temperature and during any subsequent thermal cycling which may occur during operation. Alumina ceramics generally show poor tolerance to thermally generated strains, which can lead to joint failure.

SUMMARY

The disclosure relates to adapters, systems, and methods to connect a metal component and a ceramic component. The systems and methods generally include a metal header, a header seal and a ZTA header. The adapters, systems, and methods can further include a glaze and/or a Pd or Pd-alloy coated membrane deposited on the ceramic component.

The systems and methods allow for the formation of joints that are relatively mechanically robust, relatively hermetic, and/or relatively temperature resistant. Thus, the systems and methods can form relatively strong, relatively temperature-resistant, and/or relatively gas tight unions between a metal component and a ceramic component. Without wishing to be bound by theory, it is believed that the system can be operated at relatively high temperatures (e.g., up to 650° C.) relative to certain other systems, such as those that include graphite-based sealing.

The systems and methods can reduce (e.g., prevent) fracturing, cracks, leaks/or and joint failure relative to certain other systems and methods for joining a ceramic component to a metal component. The systems and methods can be less prone to oxidation and leaking relative to certain other joining systems and methods, such as those based on graphite-based joining materials.

The systems and methods allow ceramic supported membranes, via the metal transition adapter, to be integrated into membrane reactors (e.g., by welding). This in turn facilitates the construction of large membrane reactor systems containing multitudes of membranes which are suitable for gas separation on an industrial scale. The number of steps to prepare the membrane systems can also be reduced, relative to certain other methods of preparing membrane systems. The membranes of the disclosure can have a relatively good hydrogen flux and/or selectivity. The membranes of the disclosure can also have relatively high thermal and/or reactive environment stability.

In a first aspect, the disclosure provides a system including a first metal header including a bore; a first header seal including a bore; a zirconia toughened alumina (ZTA) header including a first bore, a first socket in fluid communication with the first bore, and a first sealing stem; a first face seal including a bore; and a first ceramic component including a bore and a glazed section on a surface of a first end of the first ceramic component. The glazed section includes a member selected from the group consisting of a glass glaze and a glass-ceramic glaze. The first header seal is disposed in the bore of the first metal header. The first sealing stem of the ZTA header is disposed in the bore of the first metal header. The first header seal seals the first metal header to the ZTA header. A portion of the first end of the first ceramic component is disposed in the first socket of the ZTA header. The first face seal contacts an inner surface of the ZTA header and the glazed section of the first ceramic component and seals the first ceramic component to the ZTA header. An interior space of the first ceramic component, an interior space of the ZTA header, and an interior space of the first metal header are in fluid communication.

In some embodiments, the glazed section of the first ceramic component is on an external surface of the first end of the first ceramic component.

In some embodiments, the glazed section includes a member selected from the group consisting of CaO-Al2O3-SiO2, CaO—MgO-Al2O3-SiO2, CaO—BaO-Al2O3-SiO2, CaO—ZnO—SiO2, BaO-Al2O3-SiO2-B2O3, BaO-Y2O3-SiO2-B2O3, BaO-Al2O3-SiO2-B2O3 and CaO-La2O3-SiO2-B2O3.

In some embodiments, the glazed section has a thickness of from 1 μm to 100 μm.

In some embodiments, the system further includes a coating on an external surface of the first ceramic component. The coating includes a member selected from the group consisting of palladium and a palladium alloy.

In some embodiments, the glazed section of the first ceramic component is on an external surface of the first end of the first ceramic component and the coating at least partially covers a surface of the glazed section.

In a second aspect, the disclosure provides a system including a first metal header including a bore; a first header seal including a bore; a zirconia toughened alumina (ZTA) header including a first bore and a first sealing stem; a multi-socket manifold base including a first socket and a second socket different from the first socket; a first face seal including a bore; a second face seal including a bore; a first ceramic component including a bore and a glazed section on a surface of a first end of the first ceramic component; and a second ceramic component including a bore and a glazed section on a surface of a first end of the second ceramic component. The glazed section of the first ceramic component and the second ceramic component includes a member selected from the group consisting of a glass glaze and a glass-ceramic glaze. The first header seal is disposed in the bore of the first metal header. The first sealing stem of the ZTA header is disposed in the bore of the first metal header. The first header seal seals the first metal header to the ZTA header. The multi-socket manifold base contacts the ZTA header. A portion of the first end of the first ceramic component is disposed in the first socket of the multi-socket manifold base. A portion of the first end of the second ceramic component is disposed in the second socket of the multi-socket manifold base. The first face seal contacts an inner surface of the first socket and the glazed section of the first ceramic component and seals the first ceramic component to the multi-socket manifold base. The second face seal contacts an inner surface of the second socket and the glazed section of the second ceramic component and seals the second ceramic component to the multi-socket manifold base. An interior space of the first ceramic component, an interior space of the ZTA header, and an interior space of the first metal header are in fluid communication. An interior space of the second ceramic component, an interior space of the ZTA header, and an interior space of the first metal header are in fluid communication.

In some embodiments, the glazed section of the first ceramic component is on an external surface of the first end of the first ceramic component and the glazed section of the second ceramic component is on an external surface of the first end of the second ceramic component.

In some embodiments, the glazed section includes a member selected from the group consisting of CaO-Al2O3-SiO2, CaO—MgO-Al2O3-SiO2, CaO—BaO-Al2O3-SiO2, CaO—ZnO—SiO2, BaO-Al2O3-SiO2-B2O3, BaO-Y2O3-SiO2-B2O3, BaO—Al2O3-SiO2-B2O3 and CaO-La2O3-SiO2-B2O3.

In some embodiments, the glazed section has a thickness of from 1 μm to 100 μm.

In some embodiments, the system further includes a coating disposed on an external surface of the first ceramic component and on an external surface of the second ceramic component. The coating includes a member selected from the group consisting of palladium and a palladium alloy.

In a third aspect, the disclosure provides a system including a first metal header including a bore; a first header seal including a bore; a zirconia toughened alumina (ZTA) header including a first bore and a first sealing stem; a flow-through plate including a plurality of holes; a flow separator plate including a first plurality of holes and a plurality of diagonal grooves including a second plurality of holes different from the first plurality of holes; and a multi-channel monolith including a plurality of channels. The first header seal is disposed in the bore of the first metal header. The first sealing stem of the ZTA header is disposed in the bore of the first metal header. The first header seal seals the first metal header to the ZTA header. The flow-through plate contacts the ZTA header and the flow separator plate. The flow separator plate contacts the multi-channel monolith. A first portion of channels of the multi-channel monolith, the first plurality of the holes of the flow separator plate, the plurality of the holes of the flow-through plate, an interior space of the ZTA header, and an interior space of the first metal header are in fluid communication. A second portion of the channels of the multi-channel monolith different from the first portion of channels and the second plurality of holes in the grooves of the flow separator plate are in fluid communication.

In some embodiments, an end of the multi-channel monolith that contacts the flow separator plate includes a glazed section including a member selected from the group consisting of a glass glaze and a glass-ceramic glaze.

In some embodiments, the glazed section includes a member selected from the group consisting of CaO-Al2O3-SiO2, CaO—MgO-Al2O3-SiO2, CaO—BaO-Al2O3-SiO2, CaO—ZnO—SiO2, BaO-Al2O3-SiO2-B2O3, BaO-Y2O3-SiO2-B2O3, BaO-Al2O3-SiO2-B2O3 and CaO-La2O3-SiO2-B2O3.

In some embodiments, the glazed section has a thickness of from 1 μm to 100 μm.

In some embodiments, a coating is disposed on internal surfaces of the first plurality of channels of the multi-channel monolith, and the coating includes a member selected from the group consisting of palladium and a palladium alloy; or a coating is disposed on internal surfaces of the second plurality of channels of the multi-channel monolith, and the coating includes a member selected from the group consisting of palladium and a palladium alloy.

In a fourth aspect, the disclosure provides a system including, a first metal header including a bore; a first header seal including a bore; a second metal header including a bore; a second header seal including a bore; a zirconia toughened alumina (ZTA) header including: a first bore and a first sealing stem, a second bore and a second sealing stem, and a divider that defines a first chamber in fluid communication with the first bore and a second chamber different from the first chamber in fluid communication with the second bore; a flow-through plate including a first plurality of holes and a second plurality of holes different from the first plurality of holes; a first flow separator plate including a first plurality of holes and a plurality of diagonal grooves including a second plurality of holes different from the first plurality of holes; a second flow separator plate including a first plurality of holes and a plurality of diagonal grooves including a second plurality of holes different from the first plurality of holes; and a multi-channel monolith including a plurality of channels. The first header seal is disposed in the bore of the first metal header. The first sealing stem of the ZTA header is disposed in the bore of the first metal header. The first header seal seals the first metal header to the ZTA header. The second header seal is disposed in the bore of the second metal header. The second sealing stem of the ZTA header is disposed in the bore of the second metal header. The second header seal seals the second metal header to the ZTA header. The flow-through plate contacts the ZTA header and the first flow separator plate. The second flow separator plate contacts the first flow separator plate and the multi-channel monolith. A first portion of channels of the multi-channel monolith, the first plurality of the holes of the second flow separator plate, the second plurality of holes in the grooves of the first flow separator plate, the first plurality of holes of the flow-through plate, the first chamber, and an interior space of the first metal header are in fluid communication. A second portion of the channels of the multi-channel monolith different from the first portion of channels, the second plurality of the holes in the grooves of the second flow separator plate, the first plurality of holes of the first flow separator plate, the second plurality of holes of the flow-through plate, the second chamber, and an interior space of the second metal header are in fluid communication.

In some embodiments, a coating is disposed on internal surfaces of the first plurality of channels of the multi-channel monolith, and the coating includes a member selected from the group consisting of palladium and a palladium alloy; or a coating is disposed on internal surfaces of the second plurality of channels of the multi-channel monolith, and the coating includes a member selected from the group consisting of palladium and a palladium alloy.

In some embodiments, an end of the multi-channel monolith that contacts the second flow separator plate includes a glazed section including a member selected from the group consisting of a glass glaze and a glass-ceramic glaze.

In some embodiments, the glazed section includes a member selected from the group consisting of CaO-Al2O3-SiO2, CaO—MgO-Al2O3-SiO2, CaO—BaO-Al2O3-SiO2, CaO—ZnO—SiO2, BaO-Al2O3-SiO2-B2O3, BaO-Y2O3-SiO2-B2O3, BaO-Al2O3-SiO2-B2O3 and CaO-La2O3-SiO2-B2O3.

In some embodiments, the glazed section has a thickness of from 1 μm to 100 μm.

DETAILED DESCRIPTION

Figures 1A, 1B:
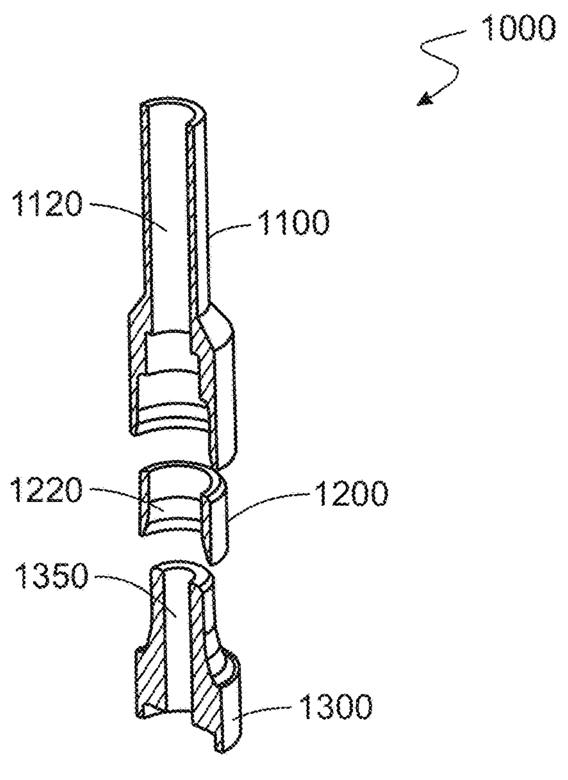
FIG. 1A schematically depicts a cross section of an adapter prior to sealing.
FIG. 1B schematically depicts a cross section of an adapter after sealing.

FIGS. 1A and 1B show cross sections of an adapter prior to sealing 1000 and after sealing 1500, respectively. The adapter prior to sealing 1000 and after sealing 1500 includes a metal header 1100, and a ZTA header 1300. The adapter prior to sealing 1000 includes a header seal preform 1200 and the adapter after sealing 1500 includes a header seal 1250. During the sealing operation, the header seal preform 1200 forms the header seal 1250 (see discussion below). The metal header 1100, header seal preform 1200, and ZTA header 1300 each include a respective bore 1120, 1220, and 1350. The adapter 1500 can be used to join a ceramic component and a metal component to provide a connection between the components. In general, the connections formed by the adapter 1500 between the ceramic component and the metal component are relatively mechanically robust, relatively gas-tight and/or relatively temperature resistant. Without wishing to be bound by theory, it is believed that the adapter 1500 can tolerate relatively high stresses without mechanical failure.

When the adapter 1500 is sealed, as shown in FIG. 1B, the header seal 1250 is disposed in the bore 1120 of metal header 1100 and a portion of the ZTA header 1300 is disposed in the bore 1120 of the metal header 1100. The ZTA header 1300 is sealed inside the metal header 1100 using the header seal 1250.

Without wishing to be bound by theory, it is believed that the robustness of the adapter 1500 depends on the geometry of its component parts (the metal header 1100, the header seal 1250, and the ZTA header 1300).

Figure 1C:
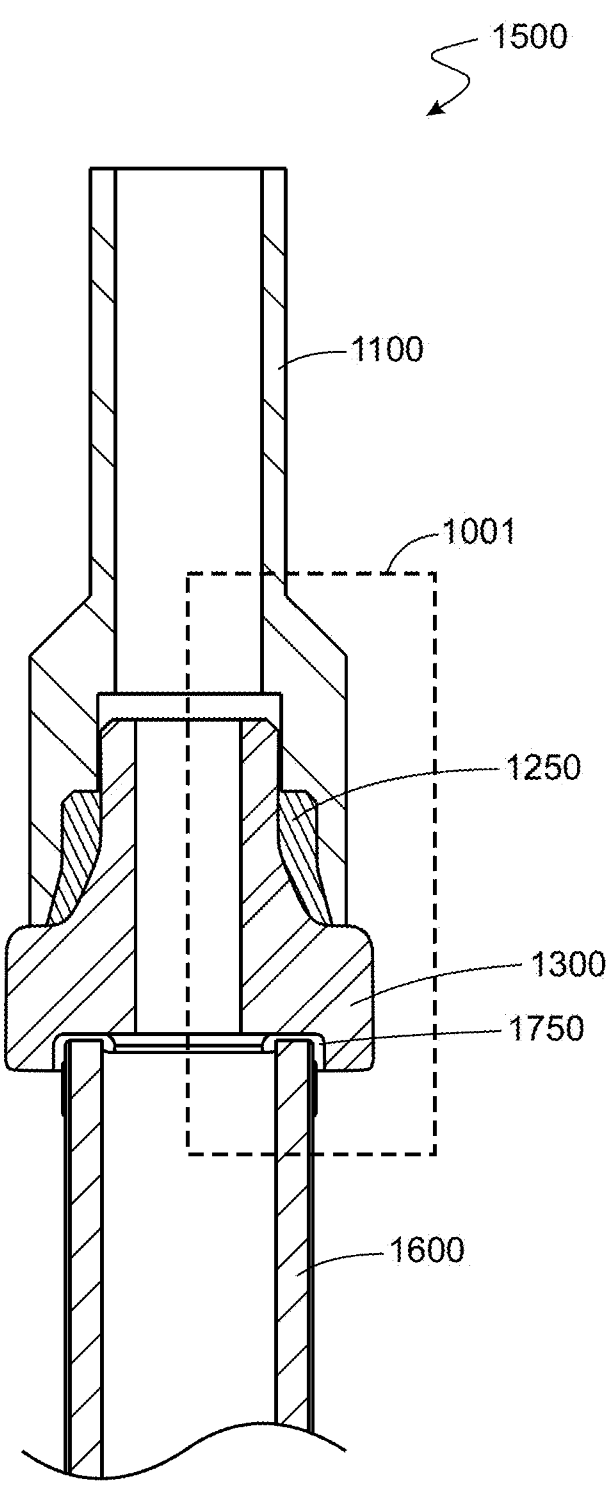
FIG. 1C schematically depicts a cross section of an adapter sealed to a ceramic component.
Figure 1D:
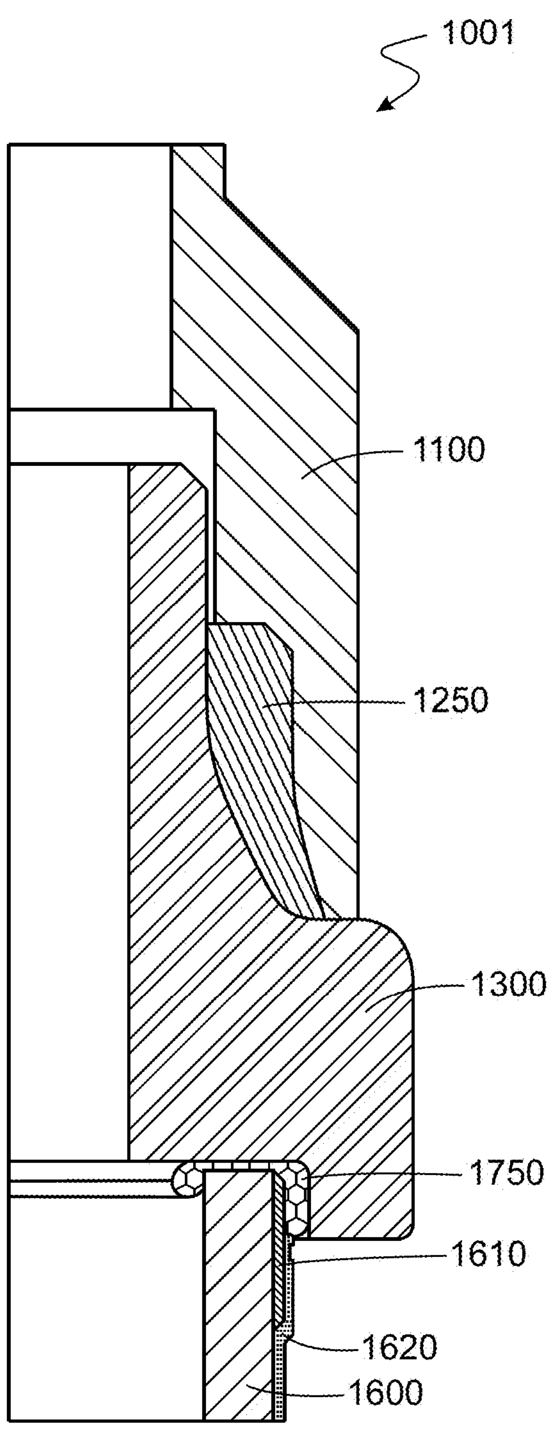
FIG. 1D schematically depicts a zoom-in of a portion of FIG. 1C.
Figure 1E:
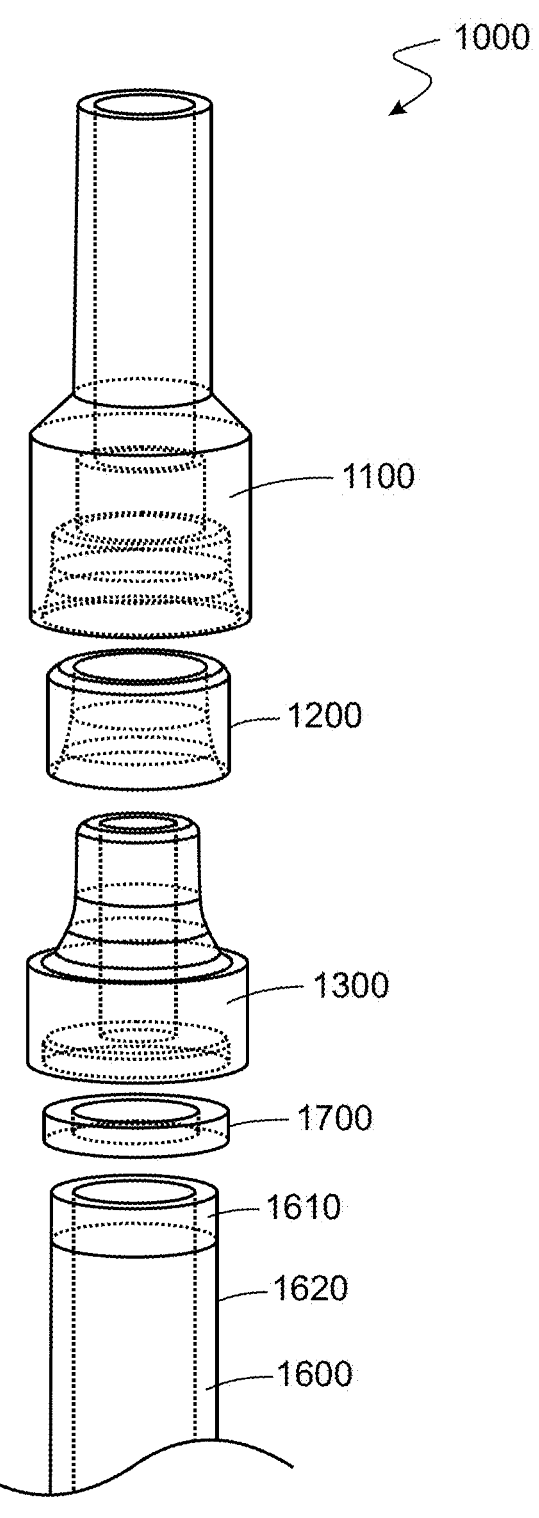
FIG. 1E schematically depicts an adapter and ceramic component prior to sealing.

FIG. 1C shows a cross section of an adapter 1500 sealed to a ceramic component 1600. FIG. 1D shows a zoom in of a portion 1001 of the adapter 1500 and ceramic component 1600. The ceramic component 1600 is sealed to the adapter 1500 with a face seal 1750. The ceramic component 1600 includes a glaze 1610 on an external surface at an end of the ceramic component 1600. Prior to joining the components, the glaze 1610 is applied to the portion of the ceramic component 1600 that will be inserted into the ZTA header 1300 as well as a few additional millimeters of the ceramic component 1600 that will extend out of the ZTA header 1300 once the components are joined. The ceramic component 1600 also includes a Pd or Pd alloy membrane 1620 coated atop an external surface of the ceramic component 1600 and the glaze 1610. FIG. 1E shows the adapter 1000 and the ceramic component 1600 prior to sealing. Prior to sealing, the face seal 1750 is in the form of a face seal preform 1700 (see discussion below).

Without wishing to be bound by theory, it is believed the robustness of the connection between the ZTA header 1300 and the ceramic component 1600 can be improved by glazing a section at the end of the ceramic component 1600 with a glass or glass-ceramic glaze 1610 prior to sealing. In general, the CTE of the glaze 1610 should be relatively close to that of the ceramic component 1600 (e.g., within ±2×10-6 K−1) to limit the magnitude of thermal expansion mismatch stresses which might otherwise cause cracking or spallation of the glaze 1610. Additionally, the glaze 1610 should be sufficiently refractory to be compatible with the sealing process. Without wishing to be bound by theory, it is believed that the glaze 1610 provides a well-anchored, relatively gas-impermeable surface with which the glass-ceramic sealing material (e.g., the face seal preform 1700) can form a relatively strong bond during sealing of the ceramic component 1600 to the ZTA header 1300, thereby improving joint strength. Examples of materials for the glaze 1610 include glasses and glass-ceramics from the CaO-Al2O3-SiO2, CaO—MgO-Al2O3-SiO2, CaO—BaO—Al2O3-SiO2, CaO—ZnO—SiO2, BaO-Al2O3-SiO2-B2O3, BaO-Y2O3-SiO2-B2O3, BaO-Al2O3-SiO2-B2O3 and CaO-La2O3-SiO2-B2O3 systems. In some embodiments, the thickness of the glaze 1610 is at least 1 (e.g., at least 2, at least 3, at least 4, at least 5, at least 6, at least 7, at least 8, at least 9, at least 10, at least 15, at least 20, at least 25, at least 30, at least 35, at least 40, at least 45, at least 50, at least 55, at least 60, at least 65, at least 70, at least 75, at least 80, at least 85, at least 90, at least 95) μm and/or at most 100 (e.g., at most 95, at most 90, at most 85, at most 80, at most 75, at most 70, at most 65, at most 60, at most 55, at most 50, and most 45, most 40, at most 35, at most 30, at most 25, at most 20, at most 15, at most 10, at most 9, at most 8, at most 7, at most 6, at most 5, at most 4, at most 3, at most 2) μm.

Without wishing to be bound by theory, it is believed that the geometry in the vicinity of the seal between the ZTA header 1300 and the ceramic component 1600 (e.g., the presence of sharp re-entrant angles and/or bubbles trapped in corners) can make coating with Pd or a Pd alloy (see discussion below) relatively challenging. However, it is further believed that the glaze 1610 can reduce (e.g., prevent) problems associated with the geometry in the vicinity of the seal as it provides a relatively impervious surface and relatively accessible surface which favors the development of a continuous coating to provide relatively continuous coverage with Pd or the Pd alloy membrane 1620 from the ceramic component 1600 to the glaze 1610. It is also believed that without the glaze 1610 there is a risk that the end of the ceramic component 1600 may be left uncoated because the boundary between the face seal 1750 and the ceramic component 1600 is inaccessible to the coating solution.

The Pd or Pd alloy membrane 1620 can be deposited onto the ceramic component 1600 using any appropriate method, such as electroless plating deposition. In some embodiments, the electroless plating deposition includes a cleaning step, a seeding step, and a Pd electroless plating step with subsequent cleaning. The plating time can be at least 0.5 (e.g., at least 1, at least 1.5) hours and/or at most 2 (e.g., at most 1.5, at most 1) hours.

The alloying element(s) can also be deposited by any appropriate method, such as electroless plating, electroplating or galvanic replacement. A subsequent cleaning step and an annealing step can be used to produce the alloy.

In some embodiments, the seeding step is performed through Sn-sensitization followed by activation with PdCl2 or by direct deposition of a Pd salt followed by a decomposition and reduction step to produce Pd nuclei. Generally, the initial Pd layer is deposited by electroless plating, but once an electrically percolating layer is produced additional layers can be deposited by electroplating. In some embodiments, the Pd or Pd alloy membranes can be deposited on external surfaces of the ceramic component by immersing it into a chemical bath. In some embodiments, the Pd or Pd alloy membranes can be deposited on internal surfaces of the ceramic component 1600 by pumping the plating solution through the appropriate channels. Manifolds present can be used to direct flow. Generally, Pd or Pd alloy membranes can be deposited onto exterior surfaces before or after sealing. Sealing a ceramic component already coated with Pd can include a repair step for membrane areas exposed to high temperatures. Generally, interior surfaces can only be coated with Pd after sealing as the gas manifolds are used as inlets and outlets for the plating chemicals.

The adapter 1500 can be used in a hydrogen separation membrane reactor that includes a porous ceramic support such as a ceramic-supported Pd or Pd alloy (e.g., alloyed with Au, Ag, Cu, Ru) membrane.

The ceramic component 1600 can be sealed into the socket 1340 of the ZTA header 1300 using a glass-ceramic sealing material (e.g., the face seal preform 1700) in a second sealing operation after the adapter 1500 had been fabricated (see discussion below). The Pd or Pd alloy membrane would be applied to the porous ceramic support in a subsequent operation as the Pd or Pd alloy membrane generally would not withstand the temperatures typically used for glass-ceramic sealing (800-1000° C.). The resulting assembly of ceramic supported Pd or Pd alloy membrane sealed to the adapter 1500 could then be joined to other reactor components such as process gas pipework or gas distribution manifolds, for example, by welding.

Figure 1F:
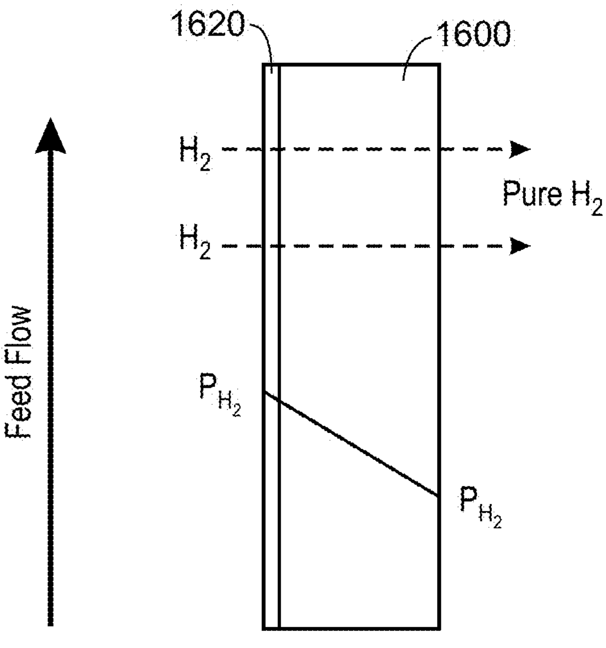
FIG. 1F schematically depicts the use of a membrane to separate hydrogen from a hydrogen-containing feed flow.
Figure 1G:
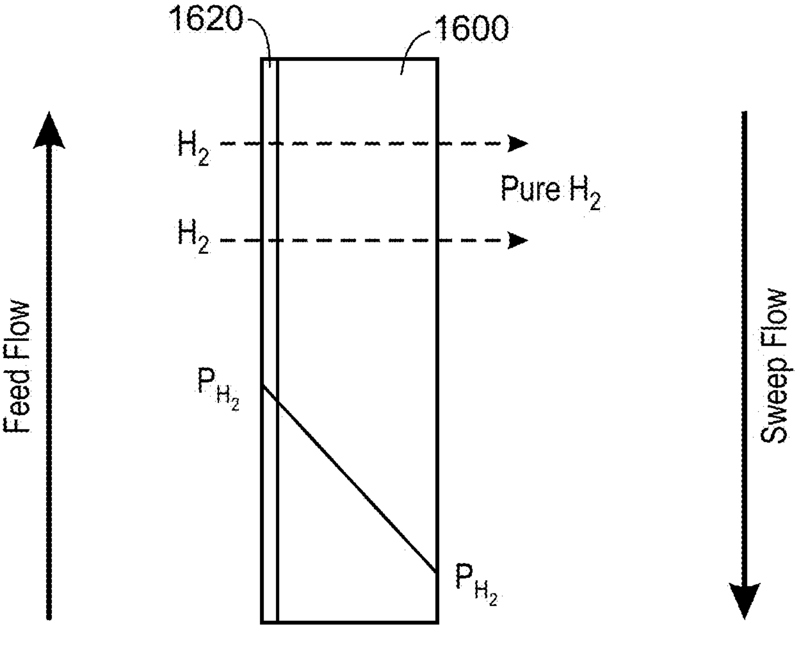
FIG. 1G schematically depicts the use of a membrane with a sweep flow on the permeate side to separate hydrogen from a hydrogen-containing feed flow.

Such membranes can be used in hydrogen production, separation and/or purification processes, dry reforming of carbon dioxide to value added products, ammonia cracking and/or syngas production (e.g., from carbon dioxide). FIGS. 1F and 1G depict schematics of a portion of the ceramic component 1600 and the Pd or Pd alloy membrane 1620 to separate hydrogen from a hydrogen-containing feed flow. Hydrogen in the hydrogen-containing feed flow (left side) can pass through the Pd membrane 1620 and porous ceramic component 1600 to the permeate zone (right side) due to the reduced partial pressure of hydrogen in the permeate zone relative to the feed side. In FIG. 1G, a sweep gas is injected into the permeate zone through the boreholes of the adapter 1500. Without wishing to be bound by theory, it is believed that injection of a sweep gas into the permeate zone can reduce the partial pressure of hydrogen on the permeate side, thereby improving separation which is driven by differences in the partial pressure. Thus, use of a sweep gas can enhance the hydrogen separation efficiency and improve hydrogen recovery by facilitating the transport of hydrogen across the membrane and minimizing the risk of hydrogen buildup on the permeate side. The use of a sweep may also permit a reduction in the surface area of membranes required to achieve targeted performance.

In certain embodiments, the sweep gas includes steam and/or an inert gas such as nitrogen or argon. In certain embodiments, the sweep gas is steam. Without wishing to be bound by theory, it is believed that steam is preferred as the sweep gas when the reaction is for low carbon hydrogen production. It is also believed that it is preferred that the sweep gas includes nitrogen if the produced and separated hydrogen is used for ammonia synthesis.

In general, the Pd or Pd alloy membrane 1620 is coated on an external surface of the ceramic component 1600. A catalyst (e.g., a catalyst for converting hydrocarbons or ammonia to hydrogen) may be packed external to the ceramic component 1600 (e.g., in a space between the ceramic component 1600 and a shell external to the ceramic component 1600). Without wishing to be bound by theory, it is believed that the pressure outside the ceramic component 1600 is higher, where the catalyst is present and hydrogen is generated, relative to inside the ceramic component 1600. Thus, having the Pd or Pd alloy membrane 1620 on the external surface of the ceramic component 1600 keeps the Pd or Pd alloy membrane 1620 in compression mode resulting in longer stability and life. It is also believed that coating from outside and pressurizing from inside may result in membrane film delamination over time.

In certain embodiments, the membranes are operated at a temperature of at least 450 (e.g., at least 500, at least 550, at least 600° C.) and/or at most 650 (e.g., at most 600, at most 550, at most 500° C.) In certain embodiments, during operation, the pressure on the feed side of the membrane is at least 10 (e.g., at least 15, at least 20, at least 25, at least 30, at least 35) bar and/or at most 40 (e.g., at most 35, at most 30, at most 25, at most 20, at most 15) bar.

Figure 2A:
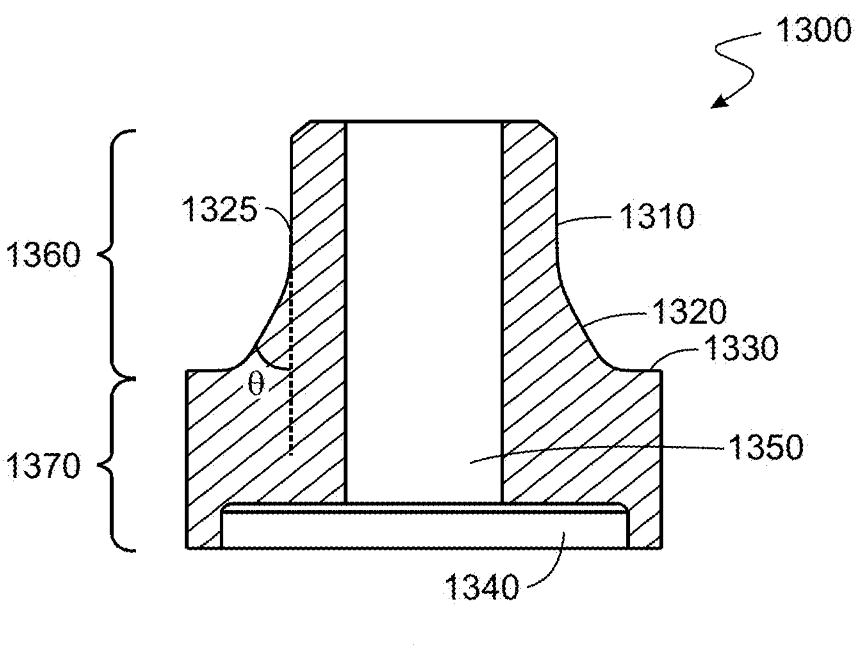
FIG. 2A schematically depicts a cross section of a ZTA header.
Figure 2B:
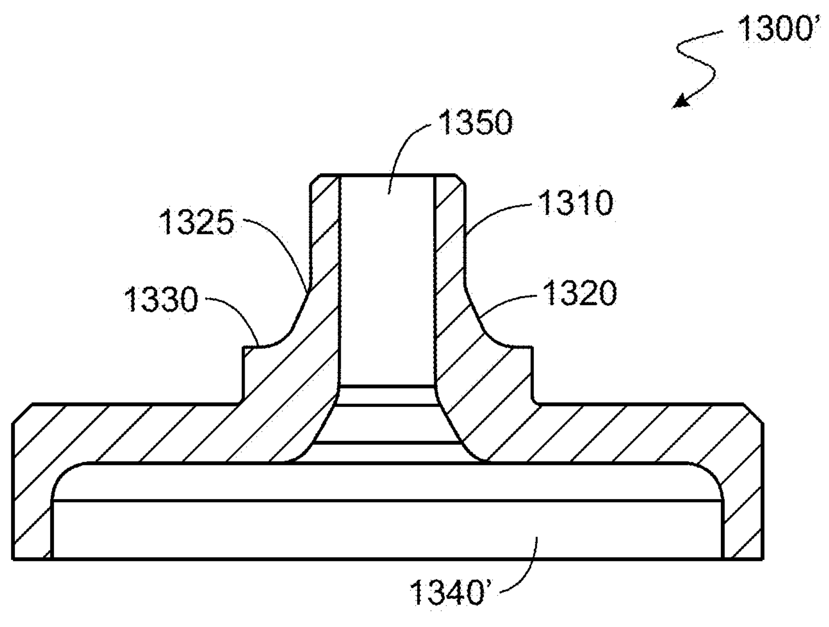
FIG. 2B schematically depicts a cross section of a ZTA header.

FIG. 2A depicts a cross section of the ZTA header 1300. The ZTA header 1300 includes a sealing stem 1360, a socket 1340, the bore 1350, and a main body 1370. The sealing stem 1360 includes a straight section 1310 and a tapered section 1320. A radiused transition (fillet) 1325 is present between straight section 1310 and the tapered section 1320. A shoulder 1330 is formed where the sealing stem 1360 meets the main body 1370. In general, the ZTA header 1300 includes a socket 1340 to house a single tube; however, the ZTA header 1300 can be shaped to house multiple tubes or to function as part of a manifold for a multi-tube bundle (see discussion below). For example, FIG. 2B depicts a cross section of a ZTA header 1300'. The ZTA header 1300' includes the components of the ZTA header 1300. However, the socket 1340' of the ZTA header 1300' is wider relative to the other components of the ZTA header 1300' compared to the socket 1340 of the ZTA header 1300. The ZTA header 1300' is shaped such that it can be sealed to a ceramic plate which includes a multitude of sockets and can function as part of a manifold for use with a multi-tube bundle (see discussion below).

When the adapter 1500 is sealed, the metal header 1100 encloses the sealing stem 1360 of the ZTA header 1300, but the main body 1370 of the ZTA header 1300 protrudes beyond the end of the metal header 1100 so that the ceramic component (e.g., a porous alumina support) may conveniently be positioned within the socket 1340 when sealing the ceramic component to the adapter 1500.

Without wishing to be bound by theory, it is believed that the tapered section 1320 between the straight section 1310 and the shoulder 1330 of the ZTA header 1300 provides mechanical strength to the adapter 1500. In some embodiments, the taper angle, shown in FIG. 2A as 0, is at least 10° (e.g., at least 15°, at least 20°, at least 25°, at least 30°, at least 35°, at least) 40° and/or at most 45° (e.g., at most 40°, at most 35°, at most 30°, at most 25°, at most 20°, at most) 15°. Without wishing to be bound by theory, it is believed that such angles provide good performance. Taper angles greater than 45° can produce relatively large shear stresses at joint interfaces. Taper angles less than 10° may involve an extended axial length to accommodate the increase in sealing stem 1360 diameter.

Typically, the maximum outer diameter of the tapered section 1320 is at least 20% larger than an outer diameter of the straight section 1310 at the location where the tapered section 1320 meets the shoulder 1330. This can be achieved by selecting an appropriate length and/or taper angle for the tapered section 1320. Without wishing to be bound by theory, it is believed that excessive increases in the diameter (e.g., the maximum outer diameter of the tapered section 1320 is greater than 50% larger than the outer diameter of the straight section 1310 at the location where it meets the shoulder 1330) can increase costs and bulkiness. In general, it is desirable to have a relatively gentle transition between the straight section 1310 and the tapered section 1320 to avoid excessive local stresses, which can initiate a fracture. In some embodiments, the fillet radius for the transition from the parallel section 1310 to the tapered section 1320 is at least 1 (e.g., at least 2, at least 3) mm.

In general, the bore 1350 of the ZTA header 1300 is kept sufficiently small to avoid reductions in strength of the adapter 1500, but large enough to be compatible with desired gas flow during use. The diameter of the bore 1350 of the ZTA header 1300 can be increased at one or both ends to improve local gas flow, such as by including a chamfer or fillet. Without wishing to be bound by theory, it is believed that such a modification would not negatively impact the integrity of the adapter since these are not in relatively high stress locations.

In general, the ZTA header 1300 includes zirconia. In some embodiments, the ZTA header 1300 has a zirconia content (in the form of partially stabilized zirconia, such as 3Y-PSZ in the case where yttria partially stabilized zirconia is used as the toughening agent) of at least 20 (e.g., at least 25, at least 30, at least 35, at least 40, at least 45, at least 50, at least 55, at least 60, at least 65, at least 70, at least 75) wt. % and/or at most 80 (e.g., at most 75, at most 70, at most 65, at most 60, at most 55, at most 50, at most 45, at most 40, at most 35, at most 30, at most 25) wt. %. Without wishing to be bound by theory, it is believed that the zirconia content of the ZTA header 1300 influences the CTE of the ZTA header 1300 and provides strength and fracture toughness. In some embodiments, the ZTA header 1300 has a CTE of at least 8.5×10-6 (at least 8.6×10-6, at least 8.7×10-6, at least 8.8×10-6, at least 8.9×10-6, at least 9.0×10-6, at least 9.1×10-6, at least 9.2×10-6, at least 9.3×10-6, at least 9.4×10-6, at least 9.5×10-6, at least 9.6×10-6, at least 9.7×10-6, at least 9.8×10-6, at least 9.9×10-6) K−1 over the range 25-1000° C. and/or at most 10.0×10-6 (e.g., at most 9.9×10-6, at most 9.8×10-6, at most 9.7×10-6, at most 9.6×10-6, at most 9.5×10-6, at most 9.4×10-6, at most 9.3×10-6, at most 9.2×10-6, at most 9.1×10-6, at most 9.0×10-6, at most 8.9×10-6, at most 8.8×10-6, at most 8.7×10-6, at most 8.6×10-6) K−1 over the range 25-1000° C. In some embodiments, the ZTA header 1300 has a strength of at least 500 MPa. In some embodiments, the ZTA header 1300 has a fracture toughness (K1C) of at least 5 MPa·m1/2.

Relatively small amounts of a secondary oxide can be added to the zirconia to impart a suitable degree of stabilization. Without wishing to be bound by theory, it is believed that the secondary oxide is in solution in the zirconia phase. Examples of the secondary oxide include MgO, Y2O3, CeO2 and CaO. Typical levels of stabilizers in the zirconia phase are 2-5 mol. % (corresponding to approximately 1.5-10 wt. % depending on the oxide).

Figures 3, 4:
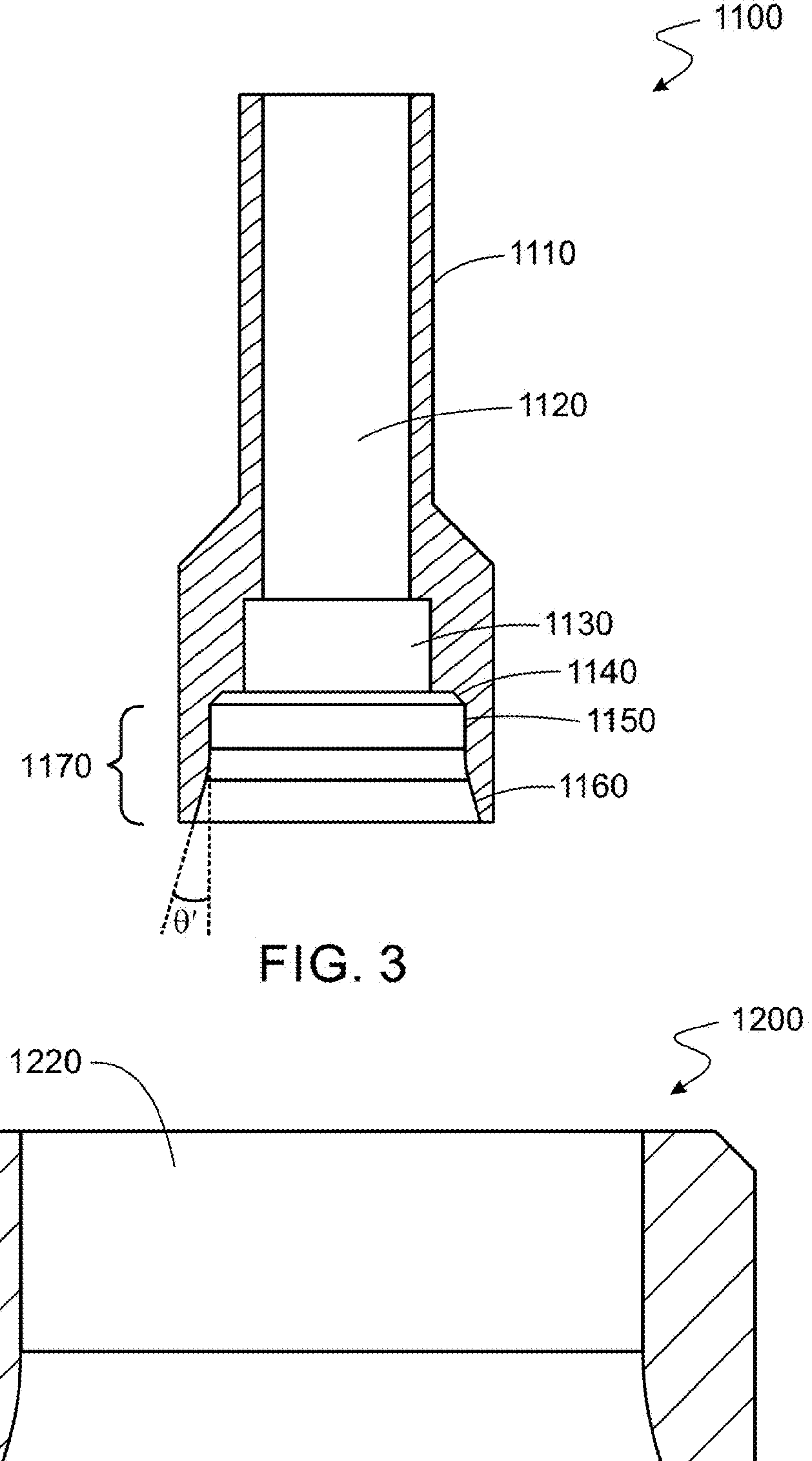
FIG. 3 schematically depicts a cross section of a metal header.
FIG. 4 schematically depicts a cross section of a header seal preform.

FIG. 3 depicts a cross section of the metal header 1100. The metal header 1100 includes a stem 1110, the bore 1120, a sealing alignment cavity 1130, an internal shoulder 1140 and a mouth 1170 divided into a straight section 1150 and tapered section 1160. In general, the angle θ' of the tapered section 1160 should not be greater than the taper angle θ of the sealing stem 1360 of the ZTA header 1300. In some embodiments, the tapered section 1160 is not included.

In general, the metal header 1100 can include any metal with a relatively low thermal expansion coefficient such as ferritic steels or Inconel. Generally, the CTE of the metal header 1100 can be 10×10-6 K−1 to 17×10-6 K−1 over the range 25-800° C. The metal header 1100 should have sufficient refractoriness to withstand the sealing process which would typically be carried out at 800-1000° C. (see discussion below) and should be chemically compatible with process gases in service.

Without wishing to be bound by theory, it is believed that the geometry of the metal header 1100 has a strong influence on the mechanical robustness and gas-tightness of the adapter 1500. In general, the diameter of the stem 1110 and the bore 1120 are chosen to match the size of the metal component to which the metal header 1100 will be joined.

Generally, it is desirable for the diameter of the sealing alignment cavity 1130 to be slightly larger (0.1-0.5 mm) than the diameter of the straight section 1310 of the ZTA header 1300, and sufficiently deep such that the sealing stem 1360 does not abut the end of the sealing alignment cavity 1130 during the sealing process so that the sealing alignment cavity 1130 can accommodate the straight section 1310 of the sealing stem 1360 of the ZTA header 1300 when the assembly is sealed. Without wishing to be bound by theory, it is believed that if the sealing stem 1360 of the ZTA header 1300 were to contact the end of the sealing alignment cavity 1130 it would prevent the continued travel of the metal header 1100 and the complete pressing of the header seal preform 1200 into place. The end of travel is defined as the point at which the rim of the mouth of the metal header 1100 makes contact with the shoulder 1330 of the ZTA header 1300.

FIG. 4 depicts a cross section of the header seal preform 1200. To form the adapter 1500, a high temperature sealing operation is employed. In the high temperature sealing operation the metal header 1100, the header seal preform 1200 and the ZTA header 1300 are assembled by inserting the header seal preform 1200 and sealing stem 1360 of the ZTA header 1300 into the mouth 1170 of the metal header 1100 and heated to a temperature which is sufficiently high to allow the header seal preform 1200, which is in a glassy state, to flow and contact the joint surfaces of the ZTA header 1300 and metal header 1100 and then to at least partially crystallize to form the header seal 1250, which includes (e.g., consists of) a glass-ceramic. In certain embodiments, the sealing temperature is at least 800 (e.g., at least 850, at least 900, at least 950° C.) and/or at most 1000 (e.g., at most 950, at most 900, at most 850° C.) The sealing process can include a dwell at the sealing temperature to ensure the desired degree of crystallization of the header seal 1250 is obtained to provide the correct CTE. The sealed assembly is cooled at a controlled rate after sealing to avoid large thermal gradients that may cause fractures. Without wishing to be bound by theory, it is believed that it is beneficial to apply an axial load during the sealing process to assist in pressing the header seal into place as it softens and flows. It is also believed that it is beneficial to use jigs to ensure that alignment of the parts is maintained during the sealing process.

The primary function of the sealing alignment cavity 1130 of the metal header 1100 is to help maintain the axial alignment of the component parts of the adapter 1500 during the sealing process. A small axial load, usually 1-100 N, is typically applied during the sealing operation. The internal shoulder 1140 of the metal header 1100 is used to transfer this load to the header seal preform 1200 to cause the header seal preform 1200 to flow into place during the high temperature sealing operation. The mouth 1170 of the metal header 1100 is sufficiently wide to accommodate the header seal preform 1200. Without wishing to be bound by theory, it is believed that it is beneficial to include the tapered section 1160 at the opening of the mouth 1170 to aid the flow of sealing material during the sealing operation and to improve the contact between the header seal 1250, the metal header 1100 and the ZTA header 1300.

In general, the header seal 1250 is a glass-ceramic with a CTE closely matching that of the ZTA header 1300, formed by the crystallization of the vitreous header seal preform 1200. Examples of the materials which might be used for header seal preform 1200 include glasses from the CaO·MgO·Al2O3·SiO2, CaO·Al2O3·SiO2, BaO·CaO·Al2O3·SiO2, CaO·ZnO·SiO2, BaO·Al2O3·SiO2·B2O3, BaO·Y2O3·SiO2·B2O3, and CaO·La2O3·SiO2·B2O3 systems. In certain embodiments, the header seal 1250 has a CTE of at least 8.0×10-6 (e.g., at least 8.1×10-6, at least 8.2×10-6, at least 8.3×10-6, at least 8.4×10-6, at least 8.5×10-6, at least 8.6×10-6, at least 8.7×10-6, at least 8.8×10-6, at least 8.9×10-6, at least 9.0×10-6, at least 9.1×10-6, at least 9.2×10-6, at least 9.3×10-6, at least 9.4×10-6, at least 9.5×10-6, at least 9.6×10-6, at least 9.7×10-6, at least 9.8×10-6, at least 9.9×10-6) K−1 and/or at most 10×10-6 (e.g., at most 9.9×10-6, at most 9.8×10-6, at most 9.7×10-6, at most 9.6×10-6, at most 9.5×10-6, at most 9.4×10-6, at most 9.3×10-6, at most 9.2×10-6, at most 9.1×10-6, at most 9.0×10-6, at most 8.9×10-6, at most 8.8×10-6, at most 8.7×10-6, at most 8.6×10-6, at most 8.5×10-6, at most 8.4×10-6, at most 8.3×10-6, at most 8.2×10-6, at most 8.1×10-6) K−1 over the temperature range 25-800° C. In certain embodiments, the CTE of the header seal 1250 is less than 1×10-6 K−1 higher than and/or no more than 2×10-6 K−1 lower than the CTE of the ZTA header 1300 over the temperature range 25-800° C. In certain embodiments, the header seal 1250 has a dilatometric softening point according to ASTM E228 of at least 700 (e.g., at least 800, at least 900° C.) Without wishing to be bound by theory, it is believed that it can be desirable to use glass-ceramic for the header seal 1250 rather glass because glass-ceramic can exhibit better mechanical and chemical stability than glass at relatively high temperatures (e.g., at least 450° C.).

The header seal preform 1200 can be either pressed and sintered, or machined from solid material. In general, it is desirable for the bore 1220 of the header seal preform 1200 to fit snugly on the straight section 1310 of the sealing stem 1360 of the ZTA header 1300, and the outer diameter of the header seal preform 1200 can be slightly (0.1-0.2 mm) smaller than the diameter of the straight section 1150 of the mouth 1170 of the metal header 1100. The height of the header seal preform 1200 can be chosen such that the sealing stem 1360 of the ZTA header 1300 protrudes enough beyond the end of the header seal 1250 preform to be engaged in the sealing alignment cavity 1130 of the metal header 1100 when the components are assembled in preparation for sealing. In some embodiments, an inner surface of the header seal preform 1200 includes a taper 1230. The taper 1230 on the inner surface of the header seal preform ideally matches the taper of the sealing stem 1360 of the ZTA header 1300. The inclusion of a taper 1230 allows the header seal preform 1200 to be positioned closer to the shoulder 1330 of the ZTA header 1300.

When the metal header 1100 is sealed to the ZTA header 1300, the header seal 1250 should ideally almost completely (>95%) fill the seal cavity between the metal header 1100 and the ZTA header 1300 without overfilling it. The seal cavity is the empty space between the internal surface of the metal header 1100 and the external surface of the ZTA header 1300 when the opening at the mouth of the metal header 1100 is in contact with the shoulder 1330 of the ZTA header 1300. This corresponds to the space occupied by the header seal 1250 in FIG. 1B. The volume of the header seal preform 1200 is chosen accordingly (e.g., by adjusting the height) taking into account, if appropriate, any volumetric changes which occur in the material of the header seal preform 1200 when it crystallizes during the sealing process. In general, the material of the header seal preform 1200 has a relatively high relative density to minimize any sintering shrinkage that may occur during sealing which would reduce the degree of filling of the seal cavity. Application of the sealing material in the form of paste or green, tape-cast preform is therefore not suitable. The rim of the mouth 1170 of the metal header 1100 comes to rest against the shoulder 1330 of the ZTA header 1300 as the header seal 1250 preform deforms during the sealing operation to give a well-defined seal cavity which is almost completely filled with glass-ceramic of the header seal 1250.

The taper on the sealing stem 1360 of the ZTA header 1300 produces a joint where the ratio of the radial thickness of the ZTA header 1300 to the radial thickness of the metal header 1100 increases towards the mouth 1170 of the metal header 1100, thereby decreasing the level of stress in the ZTA header 1300 in this region. At the same time, the straight section 1310 of the sealing stem 1360 on the ZTA header 1300 ensures hermeticity because the sealing interfaces between the metal header 1100 and the glass-ceramic of the header seal 1250 and the ZTA header 1300 and the glass-ceramic of the header seal 1250 in this region are in radial compression with low or zero levels of shear stress.

In general, the dimensions of the metal header 1100, the header seal preform 1200 and the ZTA header 1300 can be selected as appropriate based on the intended application. Additionally, the assembly and installation of the adapter 1500 would be dependent on the intended application.

In general, the metal header 1100 can be joined to a metal component by any suitable method, such as by welding. Examples of the metal component to which the metal header 1100 is to be joined include metal flanges, manifolds, and process gas connections.

In general, the ceramic component (e.g., the ceramic component 1600) can be a membrane reactor component, such as a porous ceramic membrane support, manifold, or gas distribution plate. Without wishing to be bound by theory, it is believed that the ceramic component can be sealed to the ZTA header 1300 of the adapter 1500 without detriment to the robustness or hermeticity of the adapter 1500. In some embodiments, the ceramic component (e.g., the ceramic component 1600) has a CTE of at least 6.0×10-6 (e.g., at least 6.1×10-6, at least 6.2×10-6, at least 6.3×10-6, at least 6.4×10-6, at least 6.5×10-6, at least 6.6×10-6, at least 6.7×10-6, at least 6.8×10-6, at least 6.9×10-6, at least 7.0×10-6, at least 7.1×10-6, at least 7.2×10-6, at least 7.3×10-6, at least 7.4×10-6, at least 7.5×10-6, at least 7.6×10-6, at least 7.7×10-6, at least 7.8×10-6, at least 7.9×10-6, at least 8.0×10-6, at least 8.1×10-6, at least 8.2×10-6, at least 8.3×10-6, at least 8.4×10-6, at least 8.5×10-6, at least 8.6×10-6, at least 8.7×10-6, at least 8.8×10-6, at least 8.9×10-6, at least 9.0×10-6, at least 9.1×10-6, at least 9.2×10-6, at least 9.3×10-6, at least 9.4×10-6, at least 9.5×10-6, at least 9.6×10-6, at least 9.7×10-6, at least 9.8×10-6, at least 9.9×10-6) K−1 and/or at most 10×10-6 (e.g., at most 9.9×10-6, at most 9.8×10-6, at most 9.7×10-6, at most 9.6×10-6, at most 9.5×10-6, at most 9.4×10-6, at most 9.3×10-6, at most 9.2×10-6, at most 9.1×10-6, at most 9.0×10-6, most 8.9×10-6, at most 8.8×10-6, at most 8.7×10-6, at most 8.6×10-6, at most 8.5×10-6, at most 8.4×10-6, at most 8.3×10-6, at most 8.2×10-6, at most 8.1×10-6, at most 8.0×10-6, at most at most 7.9×10-6, at most 7.8×10-6, at most 7.7×10-6, at most 7.6×10-6, at most 7.5×10-6, at most 7.4×10-6, at most 7.3×10-6, at most 7.2×10-6, at most 7.1×10-6, at most 7.0×10-6, most 6.9×10-6, at most 6.8×10-6, at most 6.7×10-6, at most 6.6×10-6, at most 6.5×10-6, at most 6.4×10-6, at most 6.3×10-6, at most 6.2×10-6, at most 6.1×10-6) K−1 over the temperature range 25-800° C. In some embodiments, the ceramic component includes aluminum oxide (Al2O3).

Generally, the ZTA header 1300 can be joined to any ceramic component that has a CTE similar to that of the ZTA header 1300. In general, the ZTA header 1300 can be joined to the ceramic component by any suitable method, such as in a high temperature sealing operation with a glass-ceramic sealing material which has a thermal expansion coefficient close to that of the ceramic component. In certain embodiments, the high temperature sealing operation is performed at a temperature of at least 800 (e.g., at least 850, at least 900, at least 950° C.) and/or at most 1000 (e.g., at most 950, at most 900, at most 850° C.) In certain embodiments, the glass-ceramic sealing material has a dilatometric softening point of at least 700 (e.g., at least 800, at least 900° C.) In certain embodiments, the glass-ceramic sealing material has a CTE of at least 7.0×10-6 (e.g., at least 7.1×10-6, at least 7.2×10-6, at least 7.3×10-6, at least 7.4×10-6, at least 7.5×10-6, at least 7.6×10-6, at least 7.7×10-6, at least 7.8×10-6, at least 7.9×10-6, at least 8.0×10-6, at least 8.1×10-6, at least 8.2×10-6, at least 8.3×10-6, at least 8.4×10-6, at least 8.5×10-6, at least 8.6×10-6, at least 8.7×10-6, at least 8.8×10-6, at least 8.9×10-6) K−1 and/or at most 9×10-6 (e.g., at most 8.9×10-6, at most 8.8×10-6, at most 8.7×10-6, at most 8.6×10-6, at most 8.5×10-6, at most 8.4×10-6, at most 8.3×10-6, at most 8.2×10-6, at most 8.1×10-6, at most 8.0×10-6, at most at most 7.9×10-6, at most 7.8×10-6, at most 7.7×10-6, at most 7.6×10-6, at most 7.5×10-6, at most 7.4×10-6, at most 7.3×10-6, at most 7.2×10-6, at most 7.1×10-6) K−1 over the temperature range 25-800° C. Without wishing to be bound by theory, it is believed that a glass-ceramic is preferred over glass as it has improved mechanical and chemical stability relative to glass at temperatures which might typically be encountered during service (e.g., 450-800° C.). Examples of the glass-ceramic sealing material include materials from CaO·MgO·Al2O3·SiO2, CaO·Al2O3·SiO2, BaO·CaO·Al2O3·SiO2, CaO·ZnO·SiO2, BaO·Al2O3·SiO2·B2O3, BaO·Y2O3·SiO2·B2O3, and CaO·La2O3·SiO2·B2O3 systems.

Figure 5A:
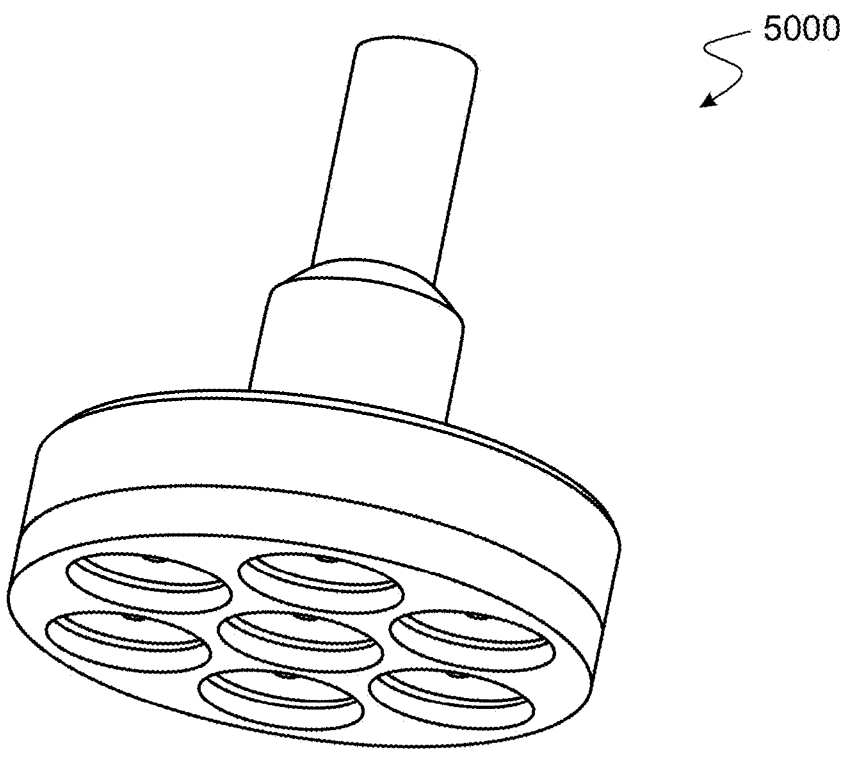
FIG. 5A schematically depicts an adapter.
Figure 5B:
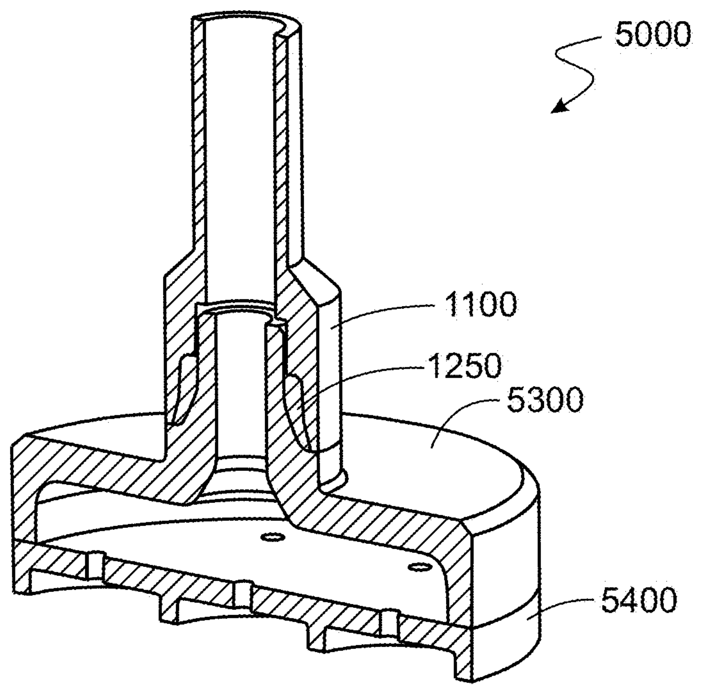
FIG. 5B schematically depicts a cross section of the adapter of FIG. 5A.

FIG. 5A depicts a schematic of an adapter 5000 and FIG. 5B depicts a cutaway view of the adapter 5000. The adapter 5000 includes the metal header 1100, the header seal 1250, a ZTA manifold header 5300 and a multi-socket ZTA manifold base 5400. In the adapter 5000, the ZTA manifold header 5300 functions as a manifold lid, which is sealed to the multi-socket ZTA manifold base 5400 with a suitable glass-ceramic sealing material with an appropriate CTE, such as the one used for the header seal 1250. They can also be joined in the green state (shaped (e.g. by pressing, slip-casting, injection molding, etc.) but not fired) and co-sintered or they may be fabricated as a single piece by suitable additive manufacturing techniques prior to sintering. The metal header 1100 is then sealed to the ZTA manifold header 5300 using the header seal 1250. The multi-socket ZTA manifold base 5400 can include ZTA or alumina. In general, the ZTA manifold header 5300 and the multi-socket ZTA manifold base 5400 can be made by any appropriate ceramic processing route, such as ceramic injection molding (CIM) or isostatic pressing/green machining.

The adapter 5000 can function as a manifold. As an inlet manifold, it would serve to distribute gas from a single inlet (entering through the metal header 1100) into seven ceramic-supported Pd or Pd alloy membrane tubes. As an outlet manifold, it would collect gas from seven ceramic-supported Pd or Pd alloy membrane tubes into a single outlet (exiting through the metal header 1100).

Figure 5C:
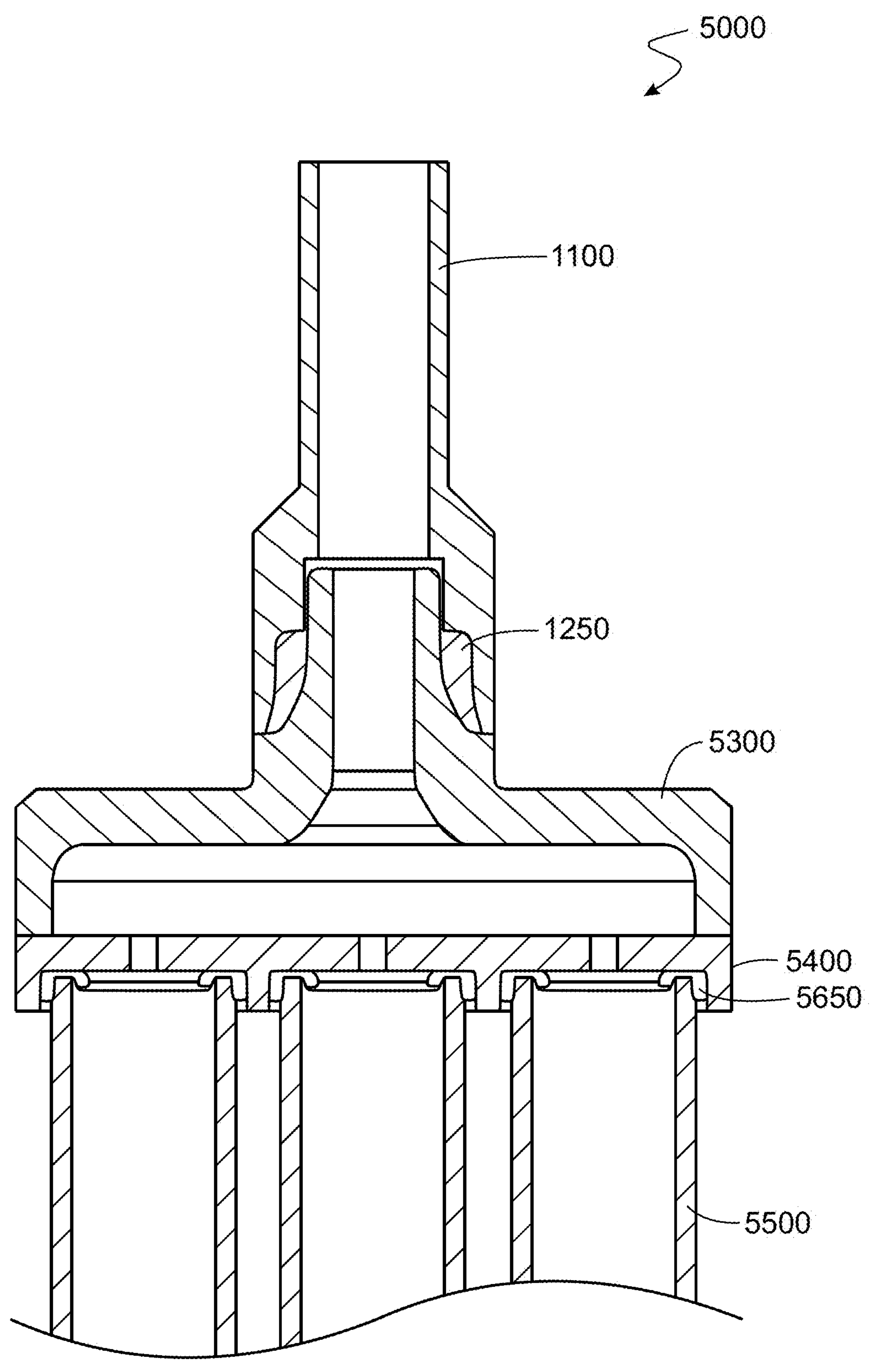
FIG. 5C schematically depicts a cross section of an adapter sealed to alumina support tubes.
Figure 5D:
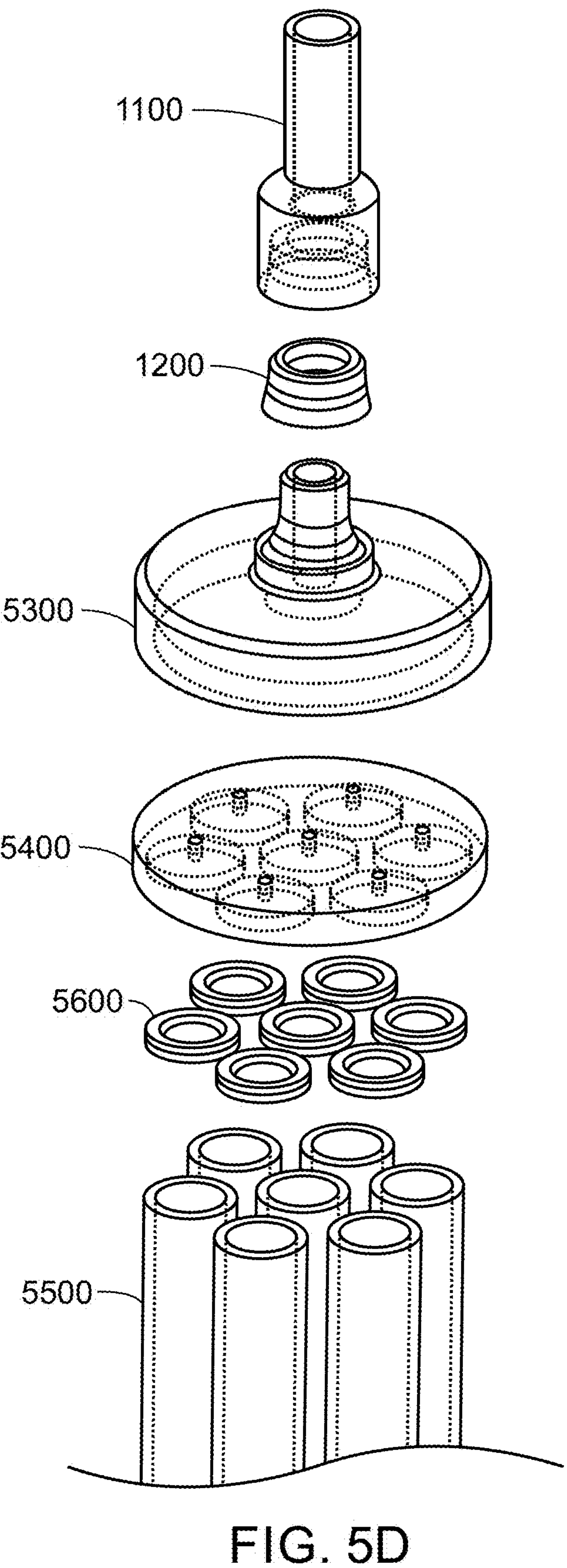
FIG. 5D schematically depicts a cross section of an adapter and alumina support tubes prior to sealing.

FIG. 5C depicts a cross section view of the adapter 5000 sealed to alumina support tubes 5500 and FIG. 5D depicts the adapter 5000 and alumina support tubes 5500 prior to sealing. The alumina support tubes 5500 are sealed into the sockets of the multi-socket ZTA manifold base 5400 with a glass-ceramic sealing material 5650 with an appropriate CTE (e.g., 6-10×10-6 K−1). The sealing material 5650 can be applied in the form of a preform 5600 (as shown in FIG. 5D) or in the form of a paste or slurry. Without wishing to be bound by theory, it is believed that preforms 5600 may be preferable as they can incorporate features to help center the end of the alumina support tubes 5500 in the sockets of the multi-socket ZTA manifold base 5400 and they provide a relatively uniform and reproducible thickness of sealing material 5650. In some embodiments, the alumina support tubes 5500 are porous.

In some embodiments, sealing of the alumina support tubes 5500 to the adapter 5000 is performed by heating to a temperature of at least 800 (e.g., at least 850, at least 900, at least 950° C.) and/or at most 1000 (e.g., at most 950, at most 900, at most 850° C.) In some embodiments, a small axial load (1-10 N) is applied throughout the sealing cycle to press the ends of the alumina support tubes 5500 into the sealing material preforms 5600 in order to promote seal formation.

Figure 5E:
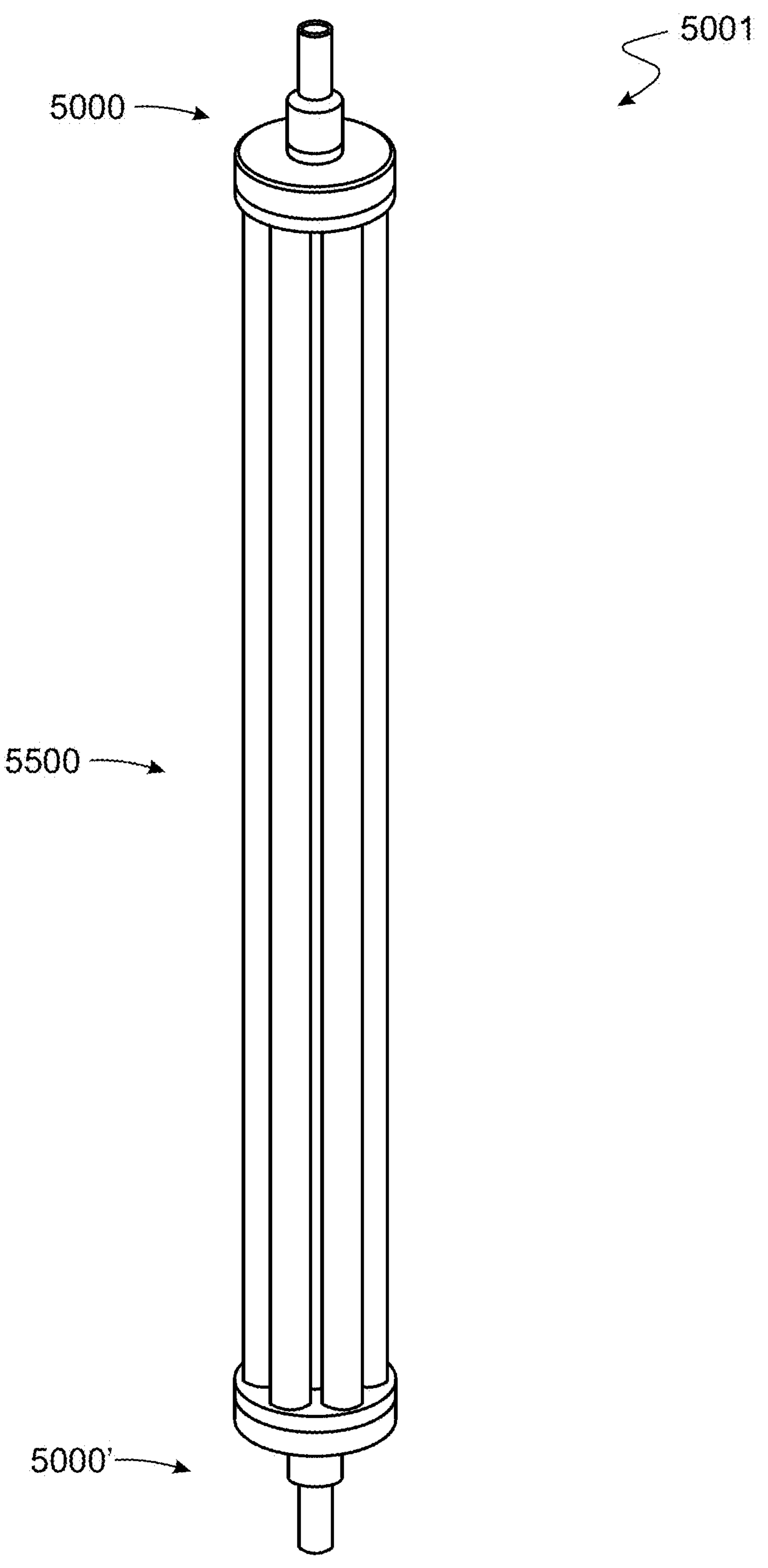
FIG. 5E schematically depicts first and second adapters sealed to alumina support tubes.

FIG. 5E depicts a system 5001 including first adapter 5000 and a second adapter 5000' sealed to alumina support tubes 5500. In general, the system 5001 can be used in any hydrogen separation application. Examples include hydrogen separation and/or hydrogen production from hydrocarbons through steam reforming or water gas shift reaction, back-cracking of ammonia to extract hydrogen, dehydrogenation of hydrocarbons, and hydrogen recovery from refinery off-gases and/or cracker off-gases.

Without wishing to be bound by theory, it is believed that jigging can be relatively challenging if the first adapter 5000 and a second adapter 5000' are sealed to the alumina support tubes 5500 simultaneously. Instead, it is believed that it is preferable that one adapter is attached first with the help of jigging to hold all the alumina support tubes 5500 in position as jigging can then be placed in between the tubes. Jigging can be located outside the hot zone of the sealing furnace and is easily removed after sealing. In general, minimal external jigging is used during the sealing of the second adapter as the tubes 5500 are adequately held in place by the adapter which is already attached. Once the first adapter 5000 and second adapter 5000' have been sealed to the alumina support tubes 5500, the Pd membrane can be deposited onto the alumina support tubes 5500. The outer surfaces of the alumina support tubes 5500 are plated simultaneously by immersing the ceramic bundle into circulating baths, using an electroless plating procedure (see description above).

In some embodiments, the alumina support tubes 5500 have a glaze applied to a relatively short section (e.g., 2-3 mm) at each end and are fired. In some embodiments, the firing is at a temperature of at least 800 (e.g., at least 850, at least 900, at least 950, at least 1000, at least 1050° C.) and/or at most 1100 (e.g., at most 1050, at most 1000, at most 950, at most 900, at most 850° C.) In embodiments that include the glaze, the glaze is applied prior to sealing the alumina support tubes 5500 to the adapter 5000.

The multi-socket ZTA manifold base 5400 is configured to accept seven tubular ceramic components. The multi-socket ZTA manifold base 5400 can be designed to accept any desired number of ceramic components, such as two, three, four, five, six, eight, nine, ten, or more ceramic components.

Figure 6A:
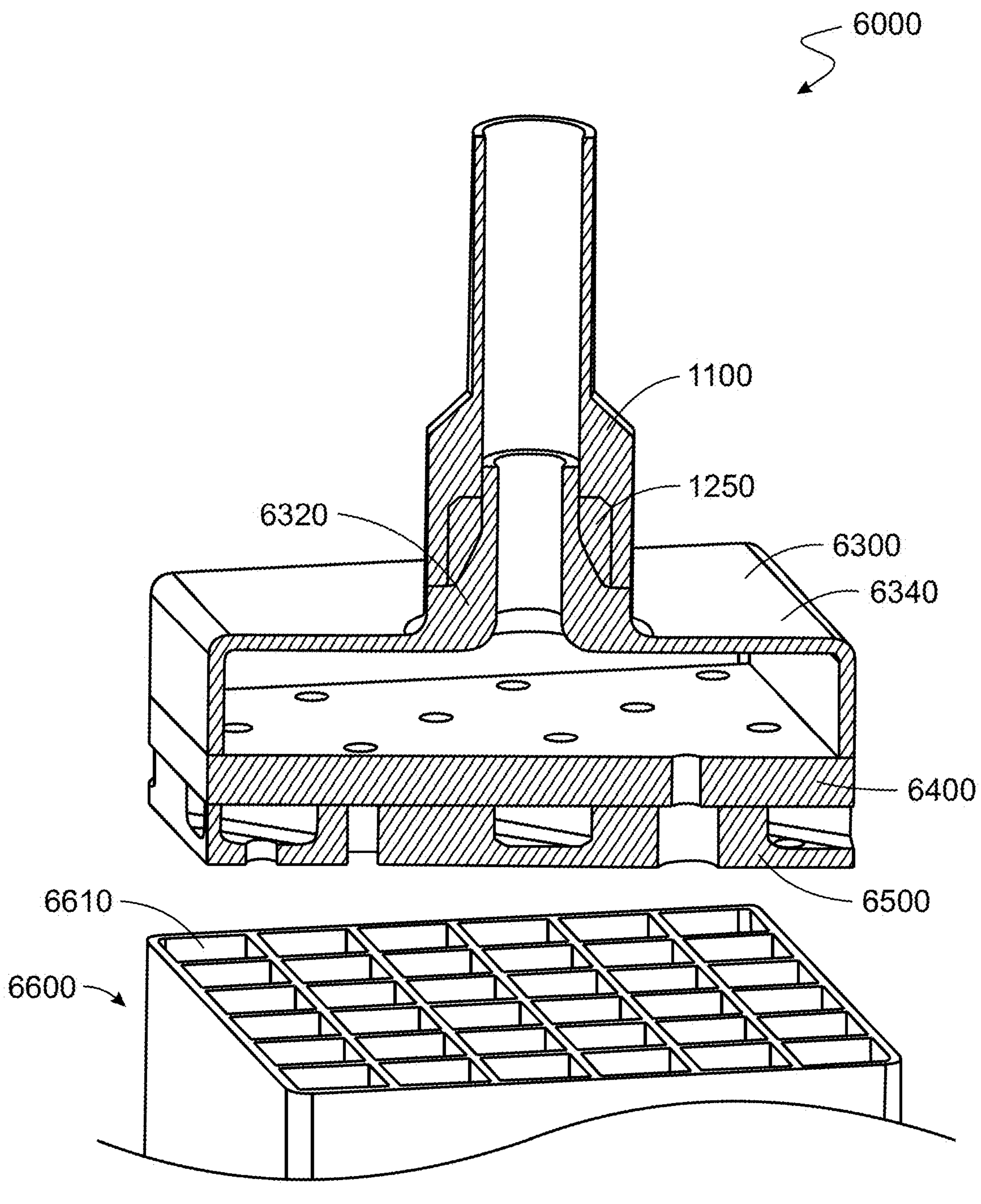
FIG. 6A schematically depicts a cross section of an adapter after sealing.
Figure 6B:
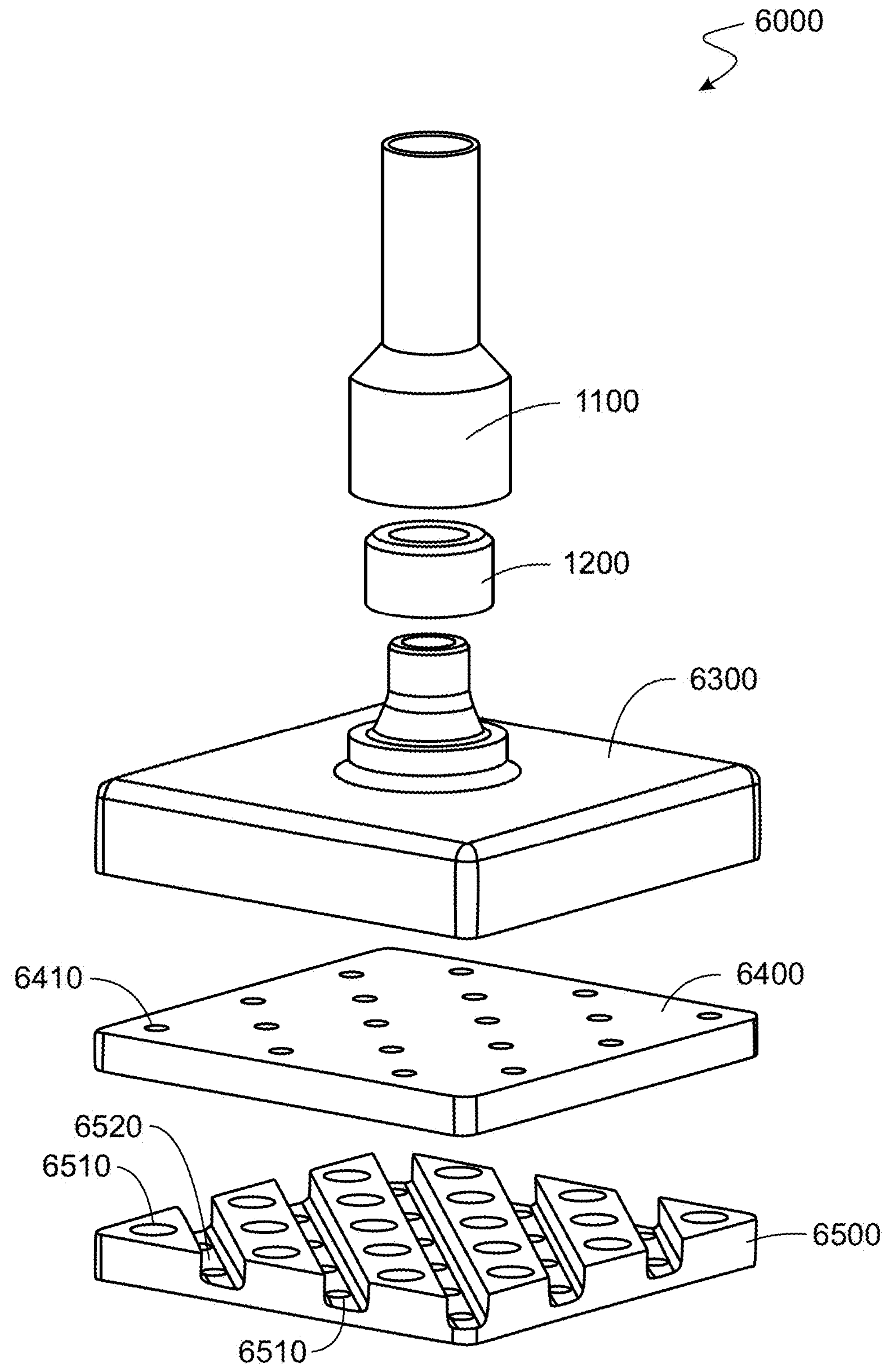
FIG. 6B schematically depicts an adapter prior to sealing.

FIG. 6A depicts a cutaway view of an adapter 6000 and FIG. 6B depicts the adapter 6000 prior to sealing. The adapter 6000 includes the metal header 1100, the header seal 1250, a ZTA header 6300 including a stem 6320 and body 6340, a flow-through plate 6400, and a flow-separator plate 6500. Prior to sealing, the adapter 6000 includes the header seal preform 1200 rather than the header seal 1250. The ZTA header 6300, the flow-through plate 6400 and the flow-separator plate 6500 form a manifold.

The ZTA header 6300 includes (e.g., consists of) ZTA. The flow-through plate 6400 and the flow-separator plate 6500 include (e.g., consist of) a ceramic such as ZTA (but possibly with a lower zirconia content than the ZTA of the ZTA header 6300) or alumina. Generally, the CTE of the ZTA header 6300, the flow-through plate 6400, and the flow-separator plate 6500 should be similar (e.g., less than 1-2×10-6 K−1 difference over the range 25-1000° C.). In general, the ZTA header 6300, the flow-through plate 6400, and the flow-separator plate 6500 can be made using any appropriate ceramic processing method such as CIM or isostatic pressing/green machining. The ceramic components of the adapter 6000 (e.g., the ZTA header 6300, the flow-through plate 6400 and the flow-separator plate 6500) can be sintered and subsequently sealed together using a glass-ceramic sealing material of suitable CTE (e.g., no more than 1×10-6 K−1 higher than, and no more than 2×10-6 K−1 less than the CTE of the ceramic components over the temperature range 25-800° C.), or they may be joined in the green state and co-sintered to form the manifold. Sealing of the manifold can be completed before the metal header 1100 is sealed to the stem of the ZTA header 6300 to form the adapter 6000. The metal header 1100 can then be sealed to the ZTA header 6300 using a glass-ceramic sealing material (e.g., the header seal 1250) with a CTE in the range 8-10×10-6 K−1, applied in the form of a sintered or machined preform (e.g., the header seal preform 1200). An axial load can be applied during the high temperature sealing process and alignment of the assembled components can be maintained by employing suitable jigging. Generally, the sealing process involves heating at a controlled rate to a temperature in the range 800-1000° C., holding at this temperature for sufficient time to allow conversion of the sealing material to a glass-ceramic, and cooling at a controlled rate to room temperature. A multi-channel monolith 6600 can be sealed to the lower face of the flow-separator plate 6500 in a subsequent operation.

Referring to FIG. 6A, the adapter 6000 can be sealed to a multi-channel monolith 6600, such as a multi-channel, porous alumina honeycomb support. The multi-channel monolith 6600 includes (e.g., consist of) a ceramic. In some embodiments, the multi-channel monolith 6600 is a multi-channel monolithic membrane support. In some embodiments, the multi-channel monolith 6600 is porous. Generally, the end faces of the multi-channel monolith 6600 are machined flat and parallel for sealing to the manifold. Without wishing to be bound by theory, it is believed that the ZTA header 6300 forms and acts as a manifold lid. In some embodiments, a glaze is applied over a relatively short section (e.g., 2-3 mm) at one or each end of the multi-channel monolith 6600 by dip-coating or other suitable means and fired on by heating to an appropriate temperature. In some embodiments, the firing is at a temperature of at least 800 (e.g., at least 850, at least 900, at least 950, at least 1000, at least 1050° C.) and/or at most 1100 (e.g., at most 1050, at most 1000, at most 950, at most 900, at most 850° C.)

The flow-separator plate 6500 has an array of holes 6510 which perforate the flow-separator plate 6500. The holes 6510 are spaced to match the arrangement of channels 6610 in the multi-channel monolith 6600, generally with one hole 6510 for each channel 6610. The lower surface of the flow-separator plate 6500 is configured to allow sealing to the end of the multi-channel monolith 6600 (e.g., the lower surface of the flow-separator plate 6500 is flat). The upper surface of the flow-separator plate 6500 contains a series of diagonal grooves 6520 aligned to intersect alternate, diagonal rows of the holes 6510.

The flow-through plate 6400 has through-holes 6410 which correspond to the position of each of the holes 6510 which are not intersected by the diagonal grooves 6520. Without wishing to be bound by theory, it is believed that when the flow-separator plate 6500 and the flow-through plate 6400 are sealed together, they allow gas from one set of channels 6610 to pass straight through and force the gas from the adjoining channels 6610 out of the side of the manifold, through the diagonal grooves 6520. This arrangement therefore allows for distribution/collection of gas flows through the multi-channel monolith 6600 in a checkerboard pattern.

Sealing material can be applied to the exposed surface of the flow-separator plate 6500 taking care not to obscure the holes 6510. The sealant may be applied in the form of a tape-cast material, punched or laser cut to provide openings which correspond to the position of the holes 6510, or may be applied by screen printing using a suitable mask. The multi-channel monolith 6600 is placed in contact with the sealant-covered surface of the flow-separator plate 6500, making sure that the two components are properly aligned. The assembled parts can be held in place with suitable jigging and transferred to a furnace for sealing. Sealing can be carried out by heating the assembly to a temperature in the range 800-1000° C. with an axial load applied to aid joint formation (typically 10-50 N).

Figure 6C:
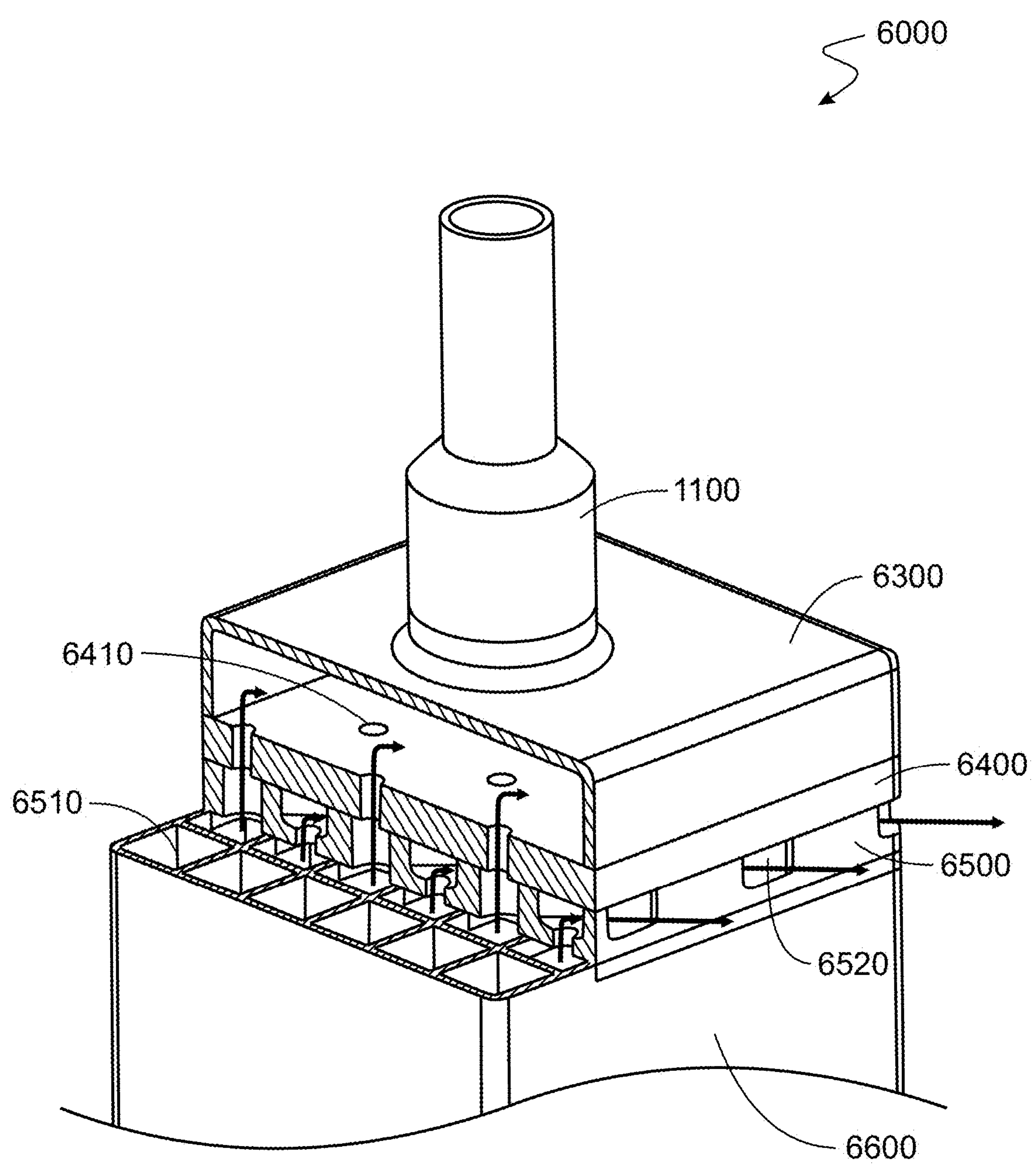
FIG. 6C schematically depicts a cross section of an adapter after sealing.

FIG. 6C depicts a cross section of the adapter 6000 showing the gas flow through the adapter 6000. A first portion of the gas exiting the multi-channel monolith 6600 passes through the through-holes 6410 and exits the adapter 6000 through the metallic header 1100. A second portion of the gas exiting the multi-channel monolith 6600 different from the first portion exits the diagonal grooves 6520.

Figure 6D:
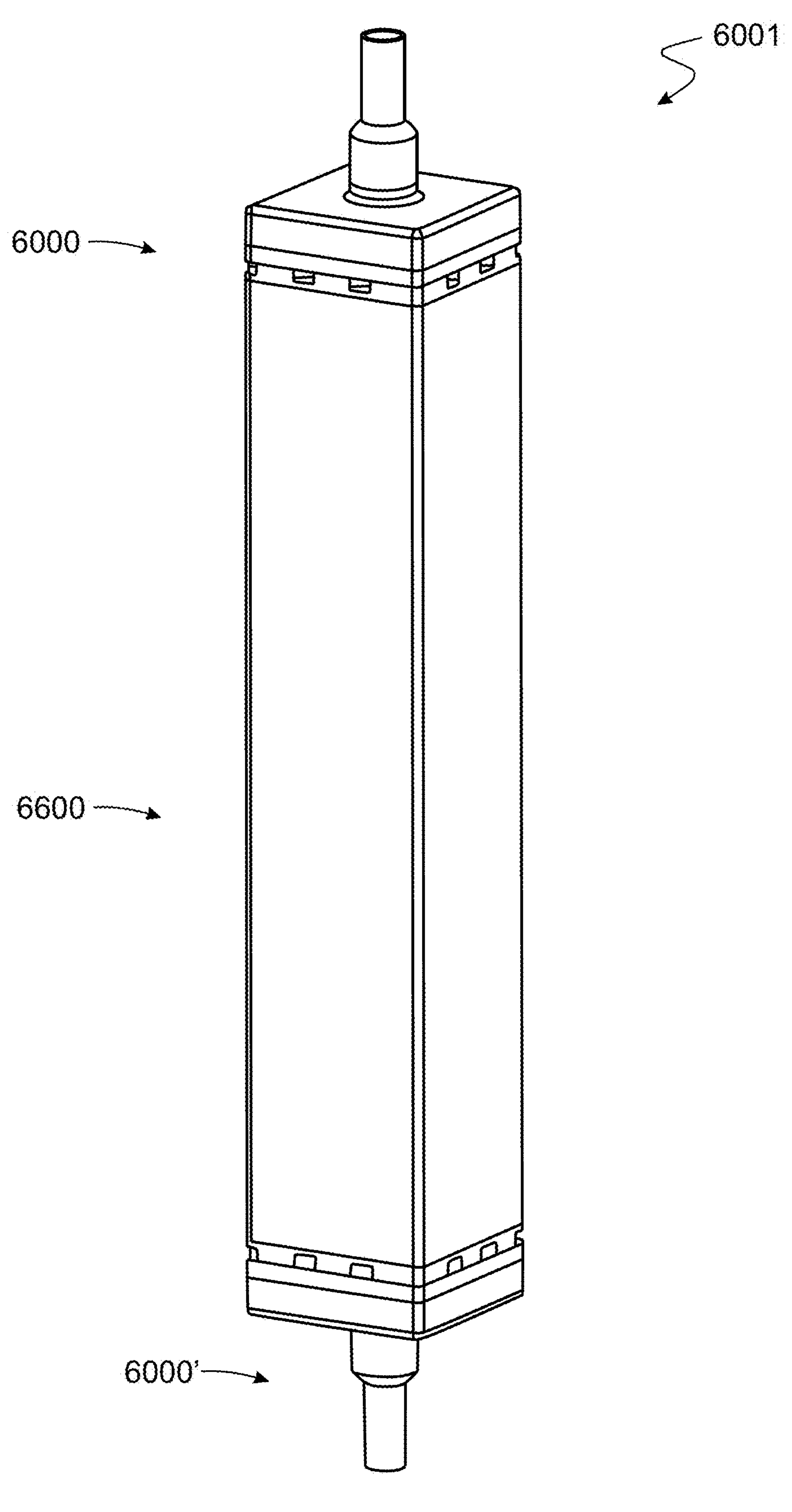
FIG. 6D schematically depicts first and second adapters sealed to a multi-channel monolith.

FIG. 6D depicts a system 6001 that includes a first adapter 6000 and a second adapter 6000' sealed to the multi-channel monolith 6600. In general, the system 6001 can be used in any hydrogen separation application (see discussion above). During sealing, both inlet and outlet manifolds (first adapter 6000 and second adapter 6000') may be sealed to the multi-channel monolith 6600 at the same time, or one manifold may be sealed to one end of the multi-channel monolith 6600 in a first sealing operation and the second manifold sealed to the other end in a subsequent sealing cycle.

Hydrogen permeable Pd membranes can be deposited onto the inner surfaces of the channels 6610 after the first adapter 6000 and/or the second adapter 6600' is/are sealed to the multi-channel monolith 6600. The Pd membranes can be deposited by electroless plating, using baths and annealing procedures as described above. The plating and rinsing baths may be pumped through the channels 6610 by connecting the tubing carrying the liquids to the adapter 6000. Alternatively, the plating and rinsing baths may be pumped through the channels 6610 which communicate with the diagonal grooves 6520.

Figure 7A:
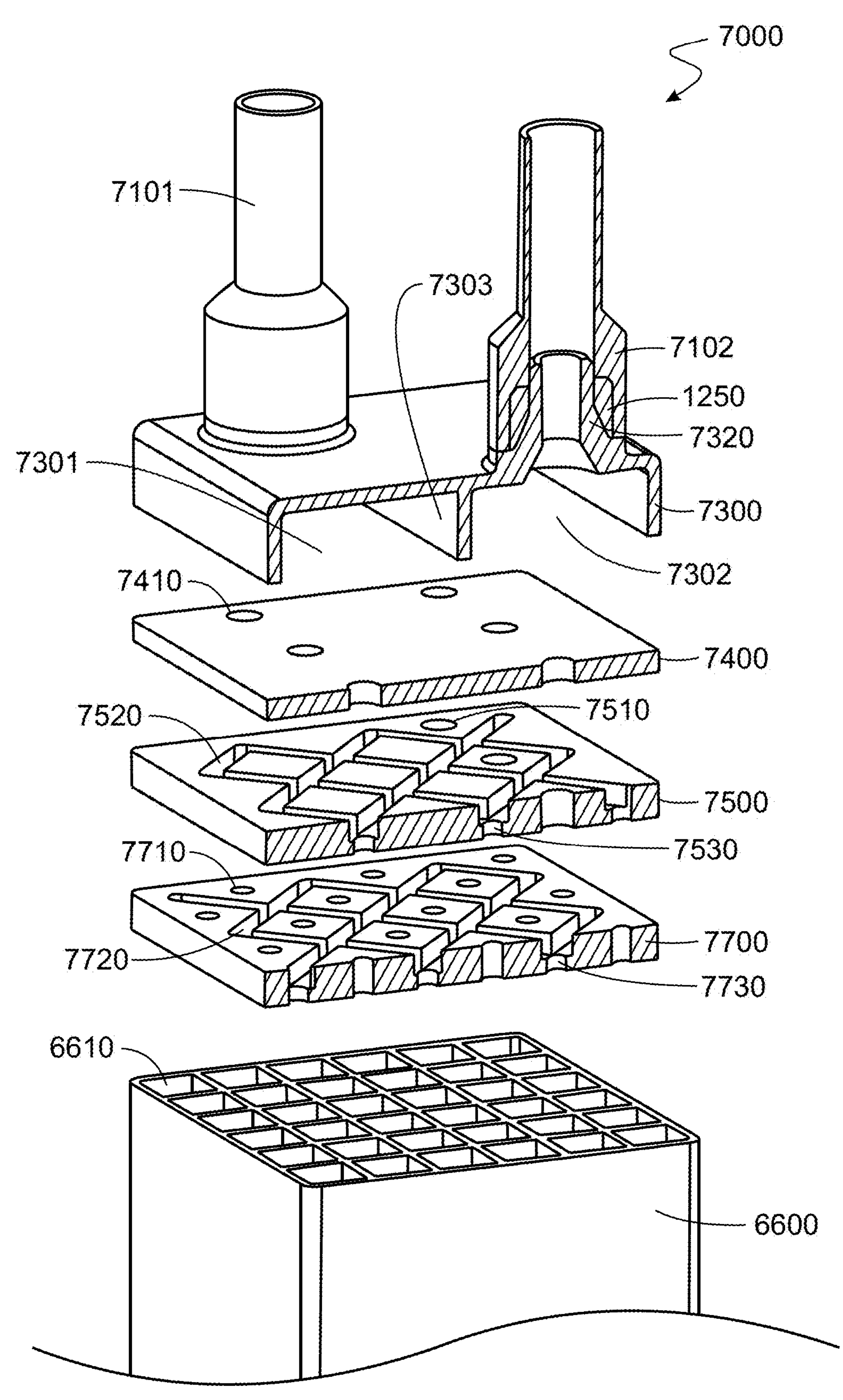
FIG. 7A schematically depicts a cross section of an adapter prior to sealing.

FIG. 7A depicts a cross section view of an adapter 7000. The adapter 7000 includes first and second metal headers 7101 and 7102, header seals 1250, a ZTA header 7300, a flow-through plate 7400, a first flow separator plate 7500, and a second flow separator plate 7700. The ZTA header 7300 includes two sealing stems 7320. The ZTA header 7300, flow-through plate 7400, first flow separator plate 7500, and second flow separator plate 7700 form a manifold.

In general, the manifold (ZTA header 7300, flow-through plate 7400, first flow separator plate 7500, and second flow separator plate 7700) can be made by any appropriate ceramic processing method such as CIM or isostatic pressing/green machining. The components can be sintered and subsequently sealed together using a glass-ceramic sealing material of appropriate CTE, or they may be joined in the green state and co-sintered to form the manifold. Alternatively, the manifold can be fabricated as one piece using suitable additive manufacturing techniques.

The first and second metal headers 7101 and 7102 can subsequently be sealed to the two sealing stems 7320 of the ZTA header 7300 using a glass-ceramic sealing material with a CTE in the range 8-10×10-6 K−1 (e.g., the header seals 1250), applied in the form of sintered or machined preforms. An axial load can be applied to the first and second metal headers 7101 and 7102 during the high temperature sealing process and alignment of the assembled parts can be maintained by employing suitable jigging. The sealing process typically involves heating at a controlled rate to a temperature in the range 800-1000° C., holding at this temperature for sufficient time to allow conversion of the sealing material to a glass-ceramic, and cooling at a controlled rate to room temperature.

The flow-through plate 7400 includes holes 7410. The first flow separator plate 7500 includes holes 7510, grooves 7520, and holes 7530 within the grooves 7520. The second flow separator plate 7700 includes holes 7710, grooves 7720, and holes 7730 within the grooves 7720. The ZTA header 7300 includes first and second chambers 7301 and 7302 separated from one another by a divider 7303. When the adapter 7100 is assembled, the first chamber 7301 is in fluid communication with the first metal header 7101 and the second chamber 7302 is in fluid communication with the second metal header 7102.

Figure 7B:
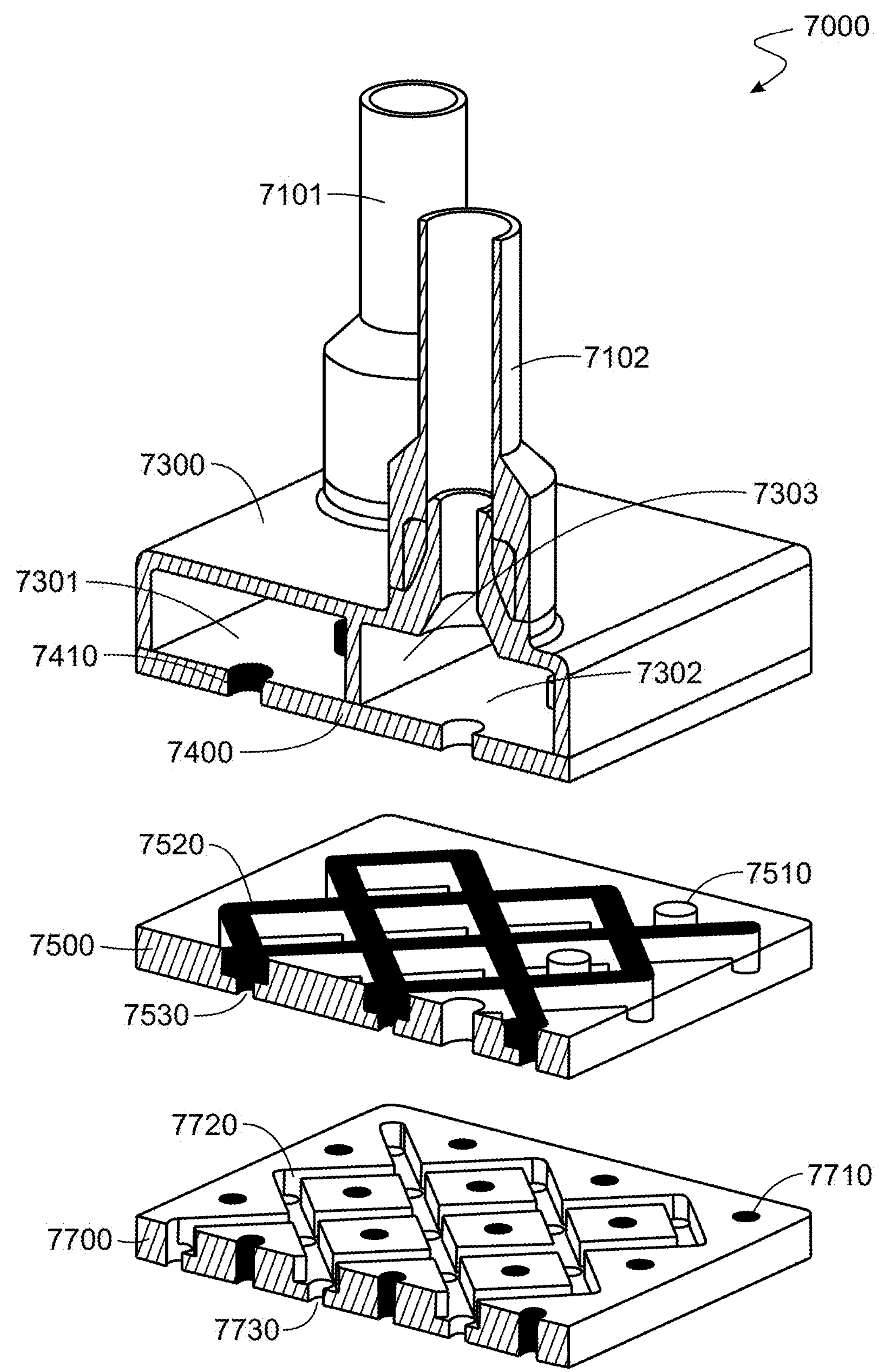
FIG. 7B schematically depicts the flow of gas through a first metal header of an adapter.

FIG. 7B schematically depicts the flow of gas through the first metal header 7101 of the adapter 7000. A first gas flows through the holes 7710 of the second flow separator plate 7700. The first gas then flows through the holes 7530 in the grooves 7520 of the first flow separator plate 7500. A first portion of the holes 7410 of the flow-through plate 7400 are in fluid communication with the grooves 7520 and holes 7530 of the first flow separator plate 7500 and holes 7710 of the second flow separator plate 7700 as well as the first chamber 7301. Thus, the first gas flows into the first chamber 7301 and exits the adapter 7000 via the first metal header 7101.

Figure 7C:
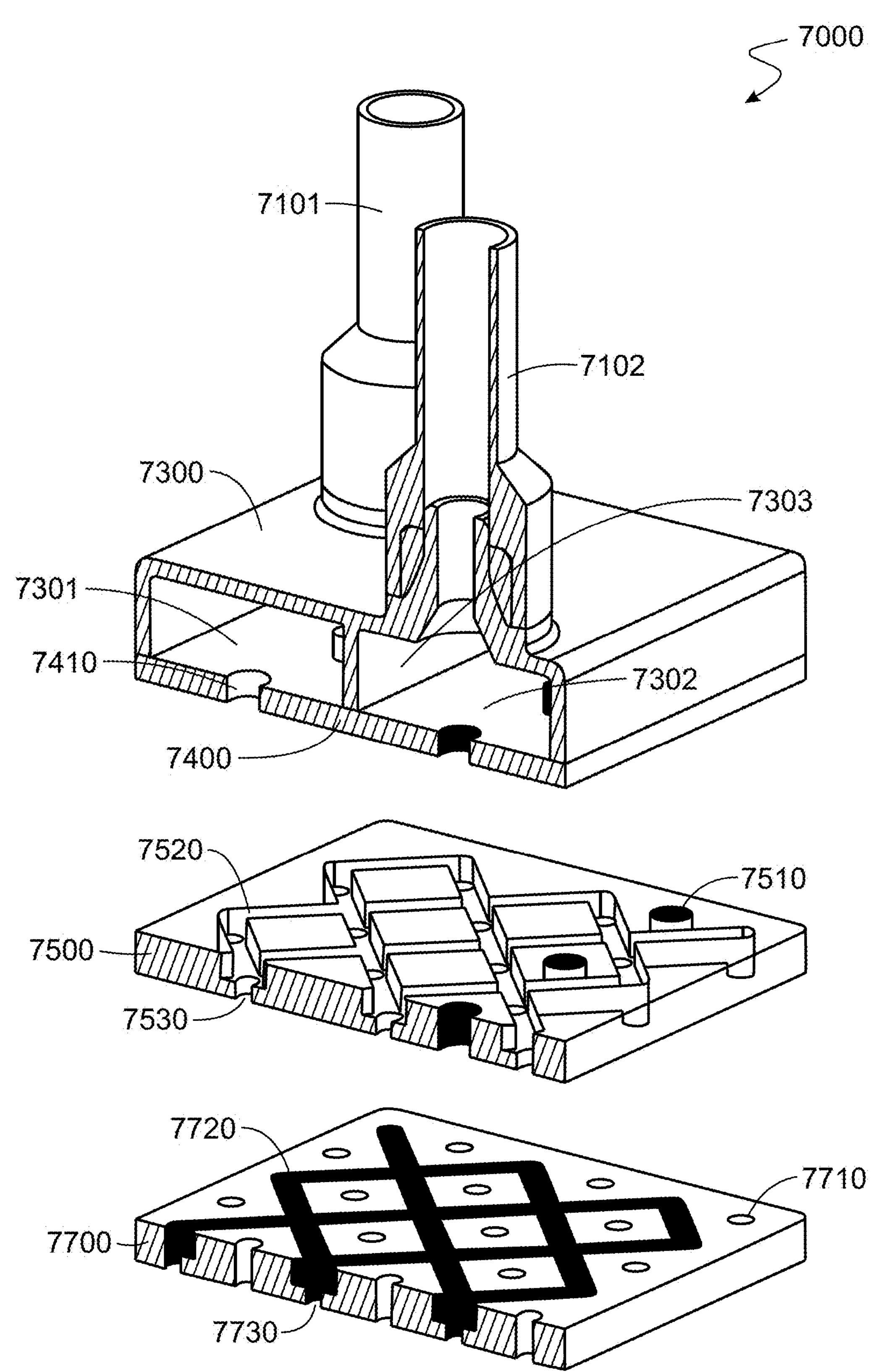
FIG. 7C schematically depicts the flow of gas through a second metal header of an adapter.

FIG. 7C schematically depicts the flow of gas through the second metal header 7102 of the adapter 7000. A second gas different from the first gas flows through the holes 7730 in the grooves 7720 of the second flow separator plate 7700. The second gas then flows through the holes 7510 of the first flow separator plate 7500. A second portion of the holes 7410 of the flow-through plate, different from the first portion of the holes 7410 are in fluid communication with the holes 7510 of the first flow separator plate 7500 and the grooves 7720 and holes 7730 of the second flow separator plate 7700 as well as the second chamber 7302. Thus, the second gas flows into the second chamber 7302 and exits the adapter 7000 via the second metal header 7102.

The adapter 7000 can be sealed to the multi-channel monolith 6600. Sealing material can be applied to the exposed surface of the manifold taking care not to obscure the holes 7710 and 7730. The sealant can be applied in the form of a tape-cast material, punched or laser cut to provide openings which correspond to the position of the holes 7710 and 7730, or may be applied by screen printing using a suitable mask. The multi-channeled monolith 6600 is placed in contact with the sealant covered surface of the manifold, making sure that the two components are properly aligned. The assembled parts are held in place with suitable jigging and transferred to a furnace for sealing. Sealing may be carried out by heating the assembly to a temperature in the range 800-1000° C. with an axial load applied to aid joint formation (typically 10-50 N).

Figure 7D:
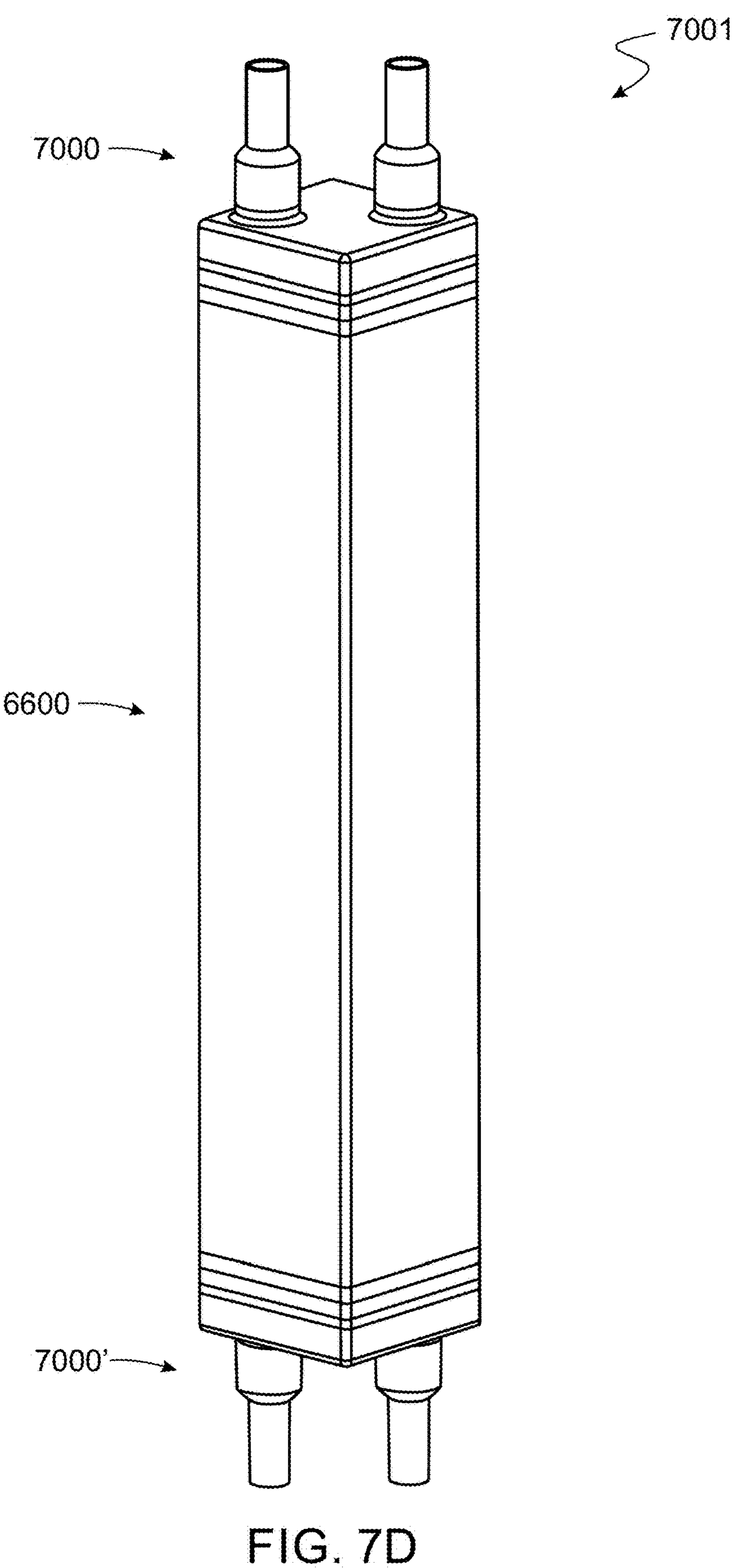
FIG. 7D schematically depicts first and second adapters sealed to a multi-channel monolith.

FIG. 7D depicts a system 7001 that includes a first adapter 7000 and a second adapter 7000' sealed to the multi-channel monolith 6600. In general, the system 7001 can be used in any hydrogen separation application (see discussion above). Both adapters may be sealed to the multi-channel monolith 6600 at the same time, or one adapter may be sealed to one end of the multi-channel monolith in a first sealing operation and the second adapter sealed to the other end in a subsequent sealing cycle.

A Pd membrane can be deposited onto the inner surfaces of the feed gas channels 6610 of the multi-channel monolith 6600 after the first adapter 7000 and a second adapter 7000' is/are sealed to the multi-channel monolith 6600. The plating and rinsing baths (as described above) can be pumped through the first metal header 7101 of each of the first adapter 7000 and second adapter 7000' by connecting tubing carrying the liquids to the appropriate inlet and outlet connections. The sweep gas connection points (the second metal header 7102 of each of the first adapter 7000 and second adapter 7000') can optionally be used to apply an under-pressure for enhancement of the penetration depth of the seeding and lower the defect concentration in the membrane. The annealing can be performed as described above. Alternatively, the plating and rinsing baths can be pumped through the second metal header 7102 of each of the first adapter 7000 and second adapter 7000' and if desired an under-pressure can be applied via the first metal header 7101 of each of the first adapter 7000 and second adapter 7000'.

Figure 8A:
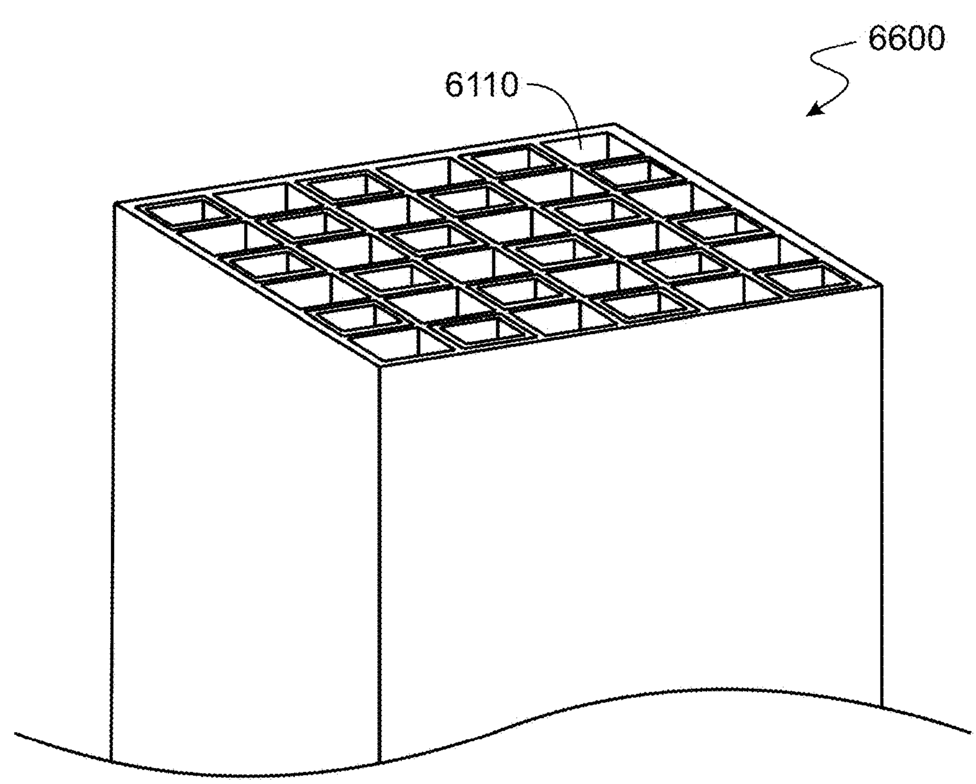
FIG. 8A schematically depicts an isometric view of a multi-channel monolith.
Figure 8B:
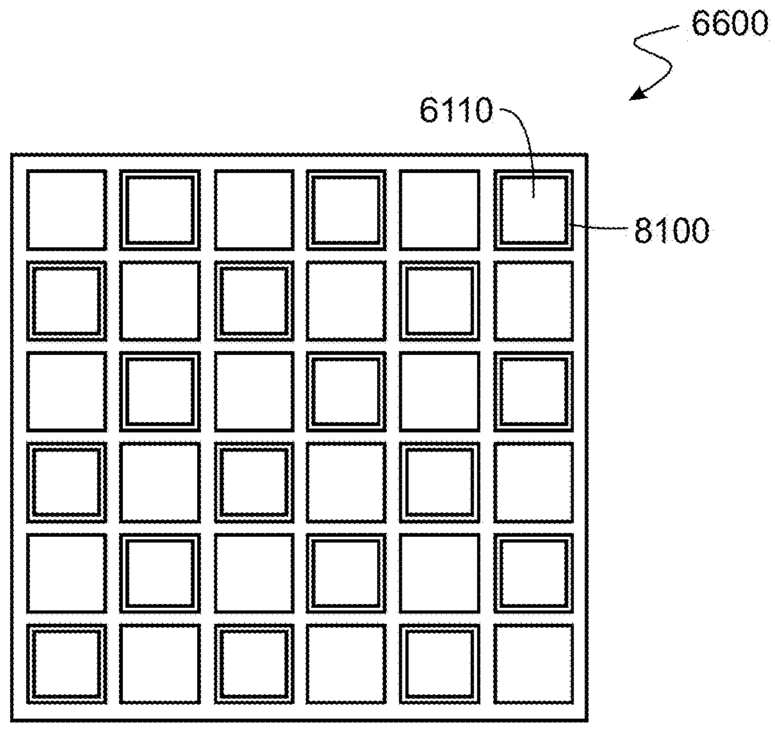
FIG. 8B schematically depicts a top view of a multi-channel monolith.

FIGS. 8A and 8B show isometric and top views, respectively, of the multi-channel monolith 6600. Alternating channels 6110 of which include a Pd-membrane coating 8100.

EXAMPLES

Example 1

Figure 9A:
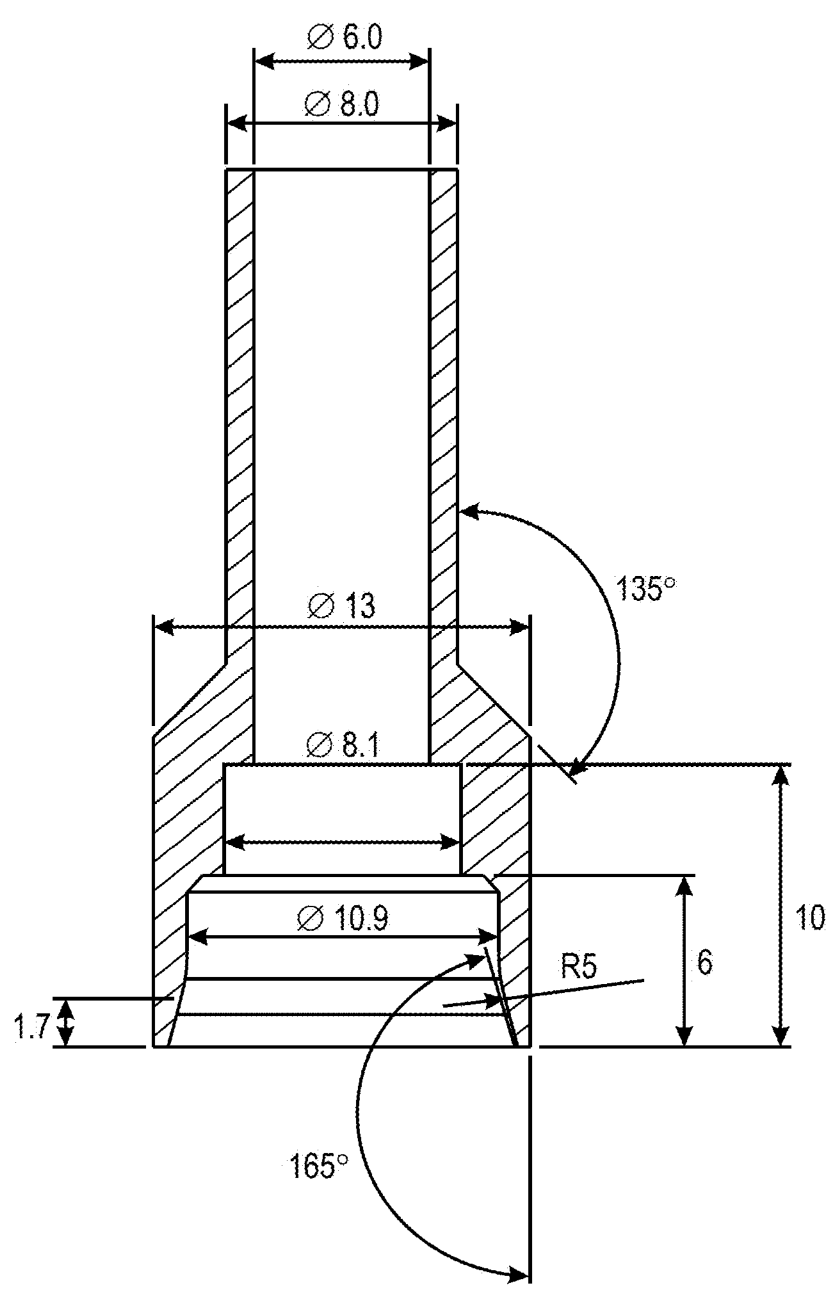
FIG. 9A schematically depicts a cross section of a metal header.

Metal headers were machined from heat resistant ferritic steel (Grade 1.4762) with the dimensions shown in FIG. 9A. The steel headers were washed, dried and pre-oxidized in air at 950° C. for 1 hour in preparation for sealing with heating and cooling rates of 5 K/min.

Figure 9B:
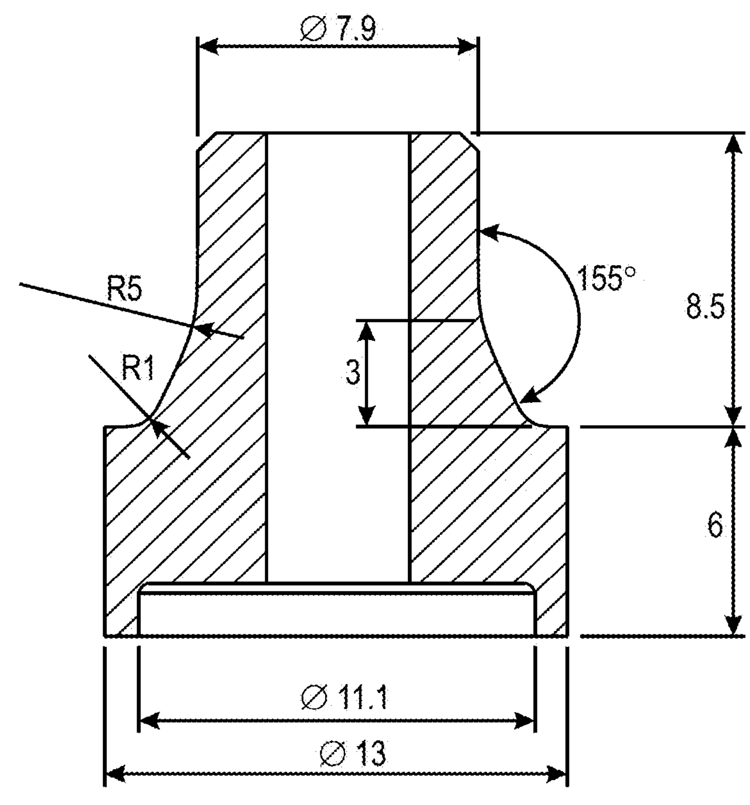
FIG. 9B schematically depicts a cross section of a ZTA header.

ZTA with a partially stabilized (3Y-PSZ) zirconia content of 40 wt. % was used for ZTA headers. The ZTA obtained was procured from Almath Crucibles, Newmarket, UK in the form of thick-walled cylinders which were subsequently machined with diamond tooling to the dimensions provided in FIG. 9B by LouwersHanique BV, Hapert, NL. R1 and R5 refer to the radius of curvature (1 mm and 5 mm, respectively) of the transitions between the tapered part and the straight or perpendicular features of the ZTA headers.

The CTE of this ZTA material was measured to be 9.1×10-6 K−1 (25-1000° C.). The CTE was measured using a Model 801L dilatometer (Bähr Thermoanalyse, Hüllhorst, DE) equipped with an alumina pushrod and sample holder. The measurement was performed in air at a heating rate of 3 K/min on a 4 mm×4 mm×50 mm sample. Correction factors obtained on a calibrated sapphire material measured under similar conditions were applied to correct for pushrod/holder expansion effects.

Figure 9C:
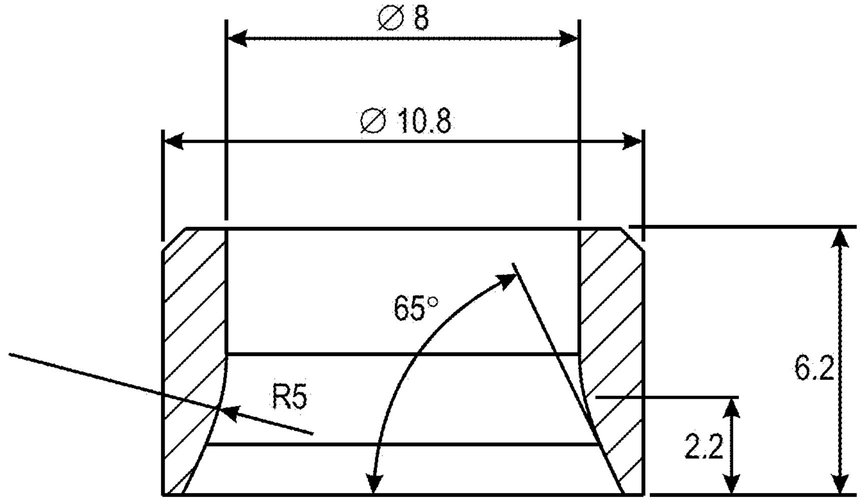
FIG. 9C schematically depicts a cross section of a header seal.

The header seal preforms were produced from a sintered CaO·MgO·Al2O3·SiO2 based glass powder, which crystallizes during sealing at 950° C. to form a glass-ceramic with a CTE of 9.0×10-6 K−1 (25-1000° C.). The CTE was measured as described above. Cylindrical pellets were pressed and sintered in house and preforms were machined from these pellets by LouwersHanique BV, Hapert, NL to the dimensions provided in FIG. 9C.

A number of adapters, each including a ZTA header, a header seal preform, and a pre-oxidized steel header were assembled by stacking the components. The adapters were placed in a square-ended, fused silica tube with an internal diameter of 18 mm together with heat-resistant steel alignment and loading fixtures and subsequently transferred to a vertical tube furnace for sealing. Sealing was accomplished by heating the assembled components in air at 5 K/min to a holding temperature of 950° C., holding at this temperature for 1 hour and then cooling to room temperature at 5 K/min or slower. An axial compressive load of approximately 0.8 N was applied to each assembly throughout the entire sealing cycle.

The sealed adapters were subsequently put through a second sealing cycle to seal a short, 10 mm diameter, closed ended, dense alumina tube into the socket on the ZTA header of each adapter. For each adapter, an annular seal preform that was approximately 1.2 mm thick×11 mm OD×7.5 mm ID, was placed in the socket and the open end of the short alumina tube was then inserted. The assembled parts were stacked in square-ended fused quartz tubes together with heat-resistant steel alignment and loading fixtures and subjected to a thermal treatment in air at 950° C. for 1 hour with an applied axial load of approximately 0.8 N. The seal preform was a sintered CaO·MgO·Al2O3·SiO2 based glass powder which converts to a glass-ceramic with a CTE of 7.9×10-6 K−1 (25-1000° C.) during the sealing cycle. The closed-ended alumina tubes were sealed to the adapters to allow them to be pressure and leak tested. Without wishing to be bound by theory, it is believed that subjecting the sealed adapters to a second sealing cycle at 950° C. to seal the dense alumina tube section prior to pressure and leak testing was important as this replicates the process which would be used to join the adapter to a porous alumina support prior to application of the Pd membrane.

The adapters sealed to alumina tubes were subjected to leak testing at 600° C. and room temperature. Prior to leak testing, a 250 mm long, 8 mm OD×6 mm ID steel extension tube (Grade 314) was welded to the stem of the steel headers of each assembly to allow the adapters to be positioned in a heated reactor tube. The test samples were mounted in the reactor using Swagelok® fittings at the cold ends of the reactor tube. The reactor tube was placed in a split vertical tube furnace. Leak tests were performed with an applied external pressure of 21.5 bara $N_2$ throughout 5 thermal cycles between 200° C. and 600° C. with heating and cooling rates of 5 K/min. Helium (1.45 mL/min at 1.5 bara) was used as a sweep gas on the inside of the adapters. The $N_2$ content of the sweep gas was measured by on-line GC analysis to enable the $N_2$ leak rate from the outside to the inside of the ZTA-metal transition adapters under the large pressure gradient to be calculated (the detection limit for $N_2$ was approximately 20 ppm). No leaks were detected at any stage of testing in three of the four test samples. The fourth sample exhibited a leak rate of approximately 0.045 mbar L $s^{-1}$ which did not vary throughout the 5 thermal cycles. The observation that the leakage rate was independent of temperature cycling suggested that it was not in an area where there were significant differences between the CTEs of the component parts and hence not in the adapter. The leakage site was subsequently found to be located at the closed end of the alumina tube in a bubble test where the test sample was subjected to an internal over-pressure of 3 bar whilst immersed in isopropanol. These leak tests show that the adapters are essentially gas-tight at temperatures up to at least 600° C.

A further 5 samples were pressure tested up to 40 bar internal over-pressure at 600° C. by pressurizing with argon. All samples were intact on completion of the high temperature pressure tests, demonstrating the high temperature robustness of the adapters. These five samples and an additional two samples were hydrostatically tested at room temperature at internal pressures of up to 300 bar using deionized water as the pressurizing medium. A manual, 2-stage hand pump rated at 700 bar (model PDSA40H2O, FPT S.r.l., Italy) was used to pressurize the test samples which were attached via Swagelok® connectors. The pressure was recorded using a LEO Record pressure data logger-300 bar capacity, Keller AG, Switzerland. Failure occurred in the seal between the ZTA header and the closed-ended alumina tube in two samples (at 52 and 97 bar), and in the dense alumina tube in a further two samples (at 157 and 211 bar). The remaining three samples remained intact after pressurizing to more than 300 bar. No failure was observed in the adapter in these hydrostatic pressure tests, indicating that they are mechanically very robust.

The results demonstrate that the adapter functions well under separation and reactive separation conditions.

Example 2

An adapter including the ZTA header, the header seal preform, and the pre-oxidized steel header of Example 1 was assembled by stacking the components. Sealing was accomplished by heating the assembled components in air at 5 K/min to a holding temperature of 950° C., holding at this temperature for 1 hour and then cooling to room temperature at 5 K/min or slower. An axial compressive load of approximately 0.7 N was applied to the assembly using deadweights with alignment being ensured by appropriate jigging throughout the entire sealing cycle.

A $CaO \cdot MgO \cdot Al_2O_3 \cdot SiO_2$ based glass powder slurry was applied to the end of a porous alumina support tube by dip coating and fired at 1000° C. for 1 hour to convert it to a glass-ceramic with a CTE of $7.9\times10^{-6}$ $K^{-1}$, corresponding to the glaze. To enhance the Pd attachment to the porous alumina support and the glazed section, $Al_2O_3$ with a particle size from (0.5 to 200 μm) was mixed with the glass powder slurry before it was applied on the porous support tube. The porous alumina support tube, glazed at one end and closed at the other end, was sealed into the socket in the ZTA header using a glass-ceramic sealing material with a CTE of $7.9\times10^{-6}$ $K^{-1}$. The seal is formed by heating the stacked components (adapter, seal preform, and glazed alumina support tube, as shown in FIG. 1E) to 950° C. at 5 K/min and holding at this temperature for 1 hour. Alignment of the components during sealing was ensured by suitable jigging.

The Pd membrane was deposited onto the ceramic part of the sealed assembly by electroless plating. The ceramic was seeded with Pd nuclei by dip coating into a solution of 4 wt. % Pd(II) acetate in ethyl acetate. The assembly was then annealed in air at 400° C. to burn off the organics, exposed to 1 bar $H_2$ at 400° C. to reduce the remaining PdO to Pd, and cooled down under an $N_2$ atmosphere. The activated ceramic was then plated by immersion in a circulating bath of 0.03 M $[Pd(NH_3)_2]Cl_2$, 0.21 M $Na_2$-EDTA and 0.01 M hydrazine ($N_2H_4$), where aqueous ammonia was used to control the pH at 11. The plating temperature was 35° C. and the plating time was 1.5 hours. The Pd membrane covered the ceramic component and extended over the glazed section. The plated ceramic was rinsed in a water bath at 85° C. prior to deposition of the alloying element. An Au-layer was also deposited by electroless plating by immersing the Pd-coated ceramic in an aqueous solution of 0.001 mol $HAuCl_4$, 0.16 mol $Na_2EDTA$, and $NH_3 \cdot H_2O$ (28 wt. %) with 100 ml $NH_4OH$ and 0.1 mol NaOH to tailor pH to 11 at 35° C. The assembly was rinsed in a water bath at 85° C. followed by annealing in 1 bar $H_2$ at 550° C. for 15 hours for alloying. Without wishing to be bound by theory, it is believed that the hydrogen atmosphere favors PdAu alloying.

Figure 10A:
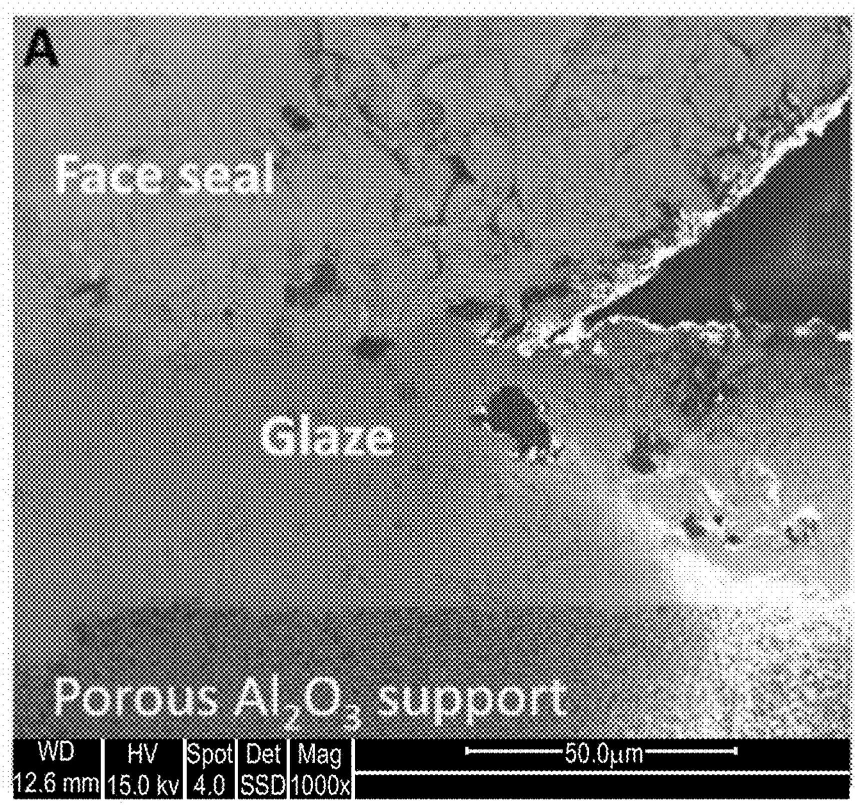
FIGS. 10A-10D show SEM images of cross-sections of a PdAu membrane electroless plated over a glass-ceramic sealed porous Al2O3 support.
Figure 10B:
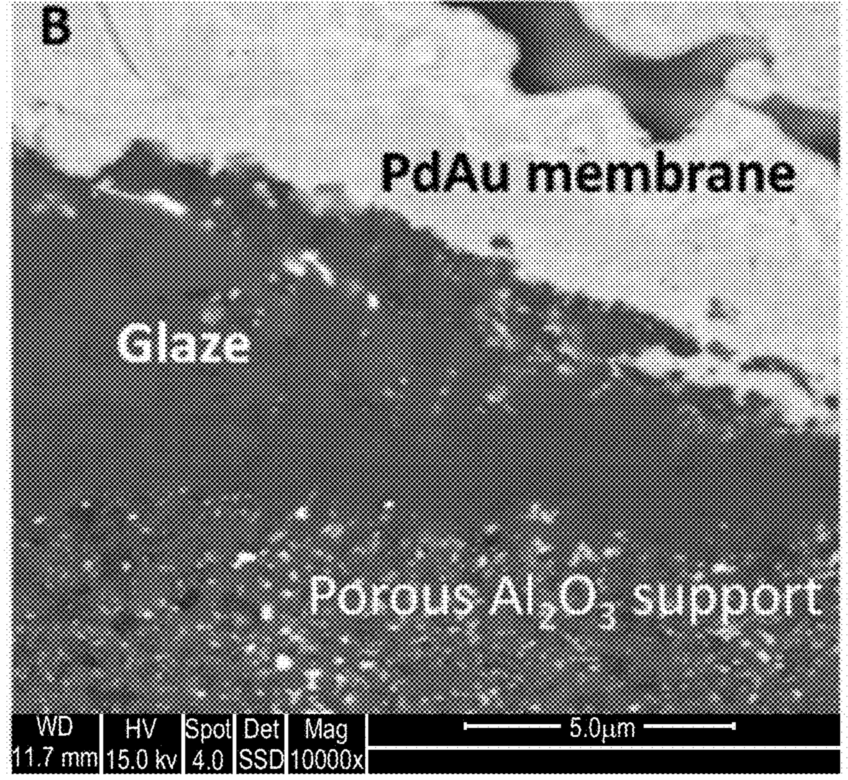
Figure 10C:
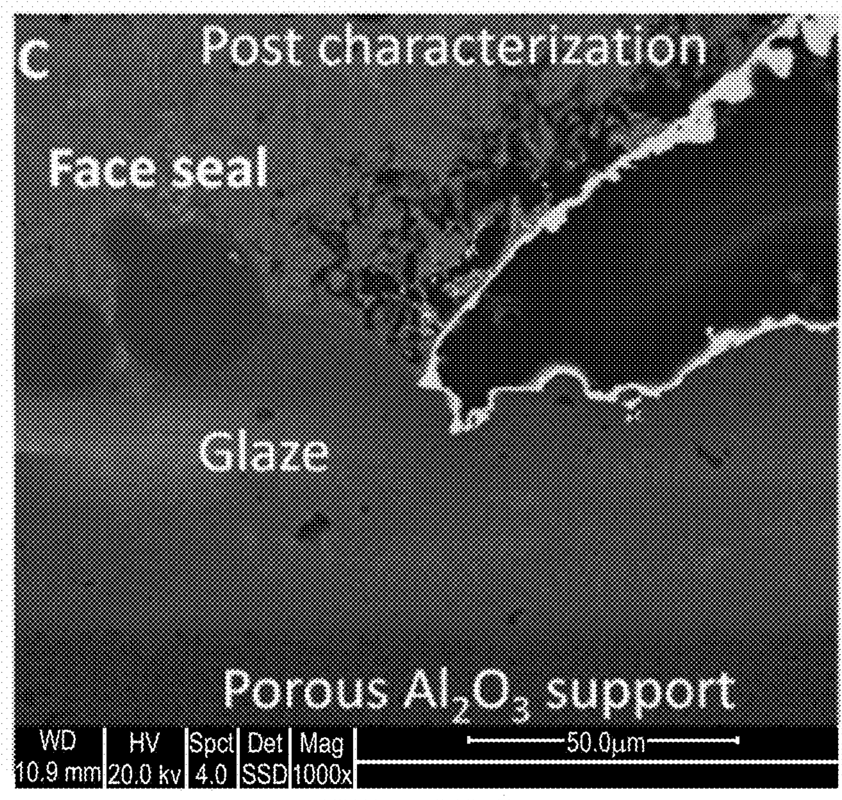
Figure 10D:
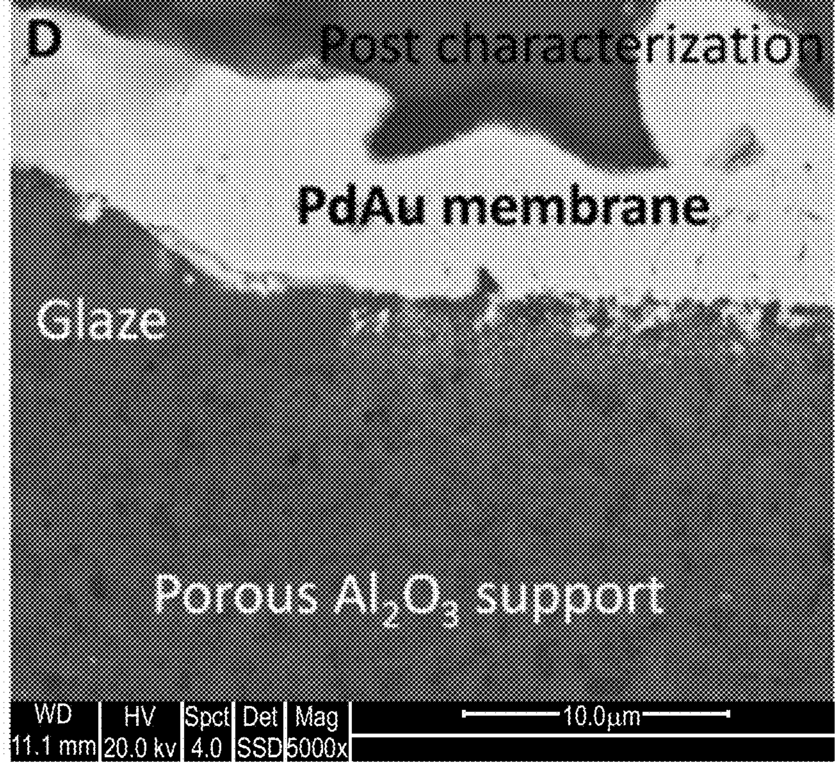

FIGS. 10A-10D show SEM images of cross-sections of the PdAu membrane electroless plated over the glass-ceramic sealed porous $Al_2O_3$ support. FIG. 10A is a cross-section of the glass-ceramic seals on the porous $Al_2O_3$ support and FIG. 10B is the interface between the glaze and the porous support. FIG. 10C is a cross section of the glass-ceramic seal on the porous $Al_2O_3$ support and FIG. 10D is the interface between the glaze and the porous support after 400 hours under steam reforming conditions at 575° C.

Figures 11A, 11B, 11C:
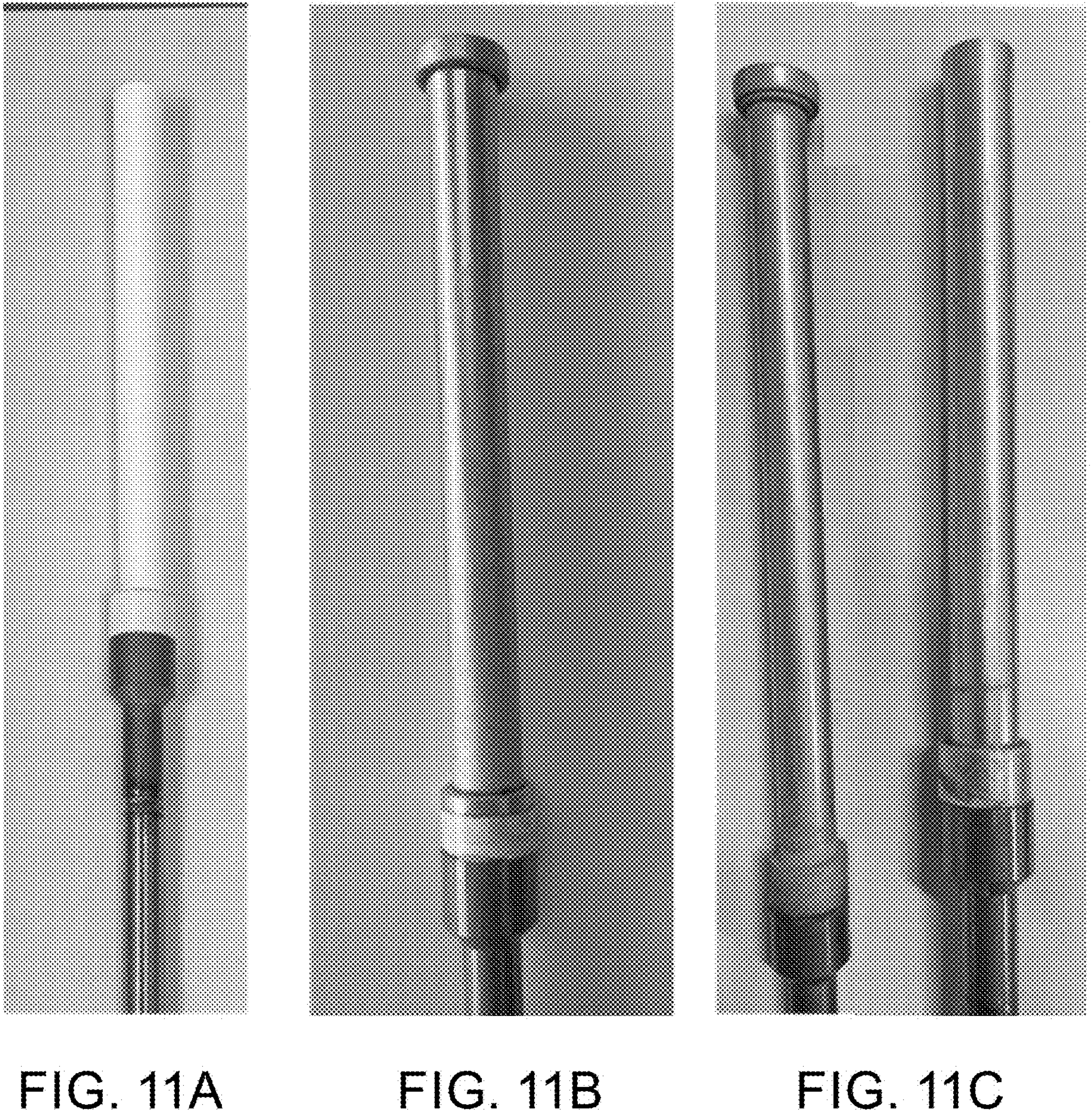
FIGS. 11A-11C show images of a support with adapter and membrane with adapter before and after annealing.

FIG. 11A shows an image of the ceramic support and the adapter before PdAu membrane deposition. FIG. 11B shows an image of the membrane and adapter with Pd electroless plating then gold electroless plating on the support prior to annealing. FIG. 11C shows an image of the membrane and the adapter after annealing forming a uniform Pd—Au alloy.

Example 3

$H_2$ flux testing on the PdAu membrane with the adapter prepared in the preceding example was performed under pure hydrogen at 450 to 600° C. The PdAu membrane was first heated to a target temperature under nitrogen atmosphere with a ramp rate of 1° C. $min^{-1}$. Then hydrogen (99.995%) was introduced. The pressure of the feed and sweep side of the membrane were controlled by a back pressure controller. The sweep pressure was kept at 1 bara. The permeated hydrogen flow at the sweep side was determined by a hydrogen flowmeter from ALICAT SCIENTIFIC.

Figure 12:
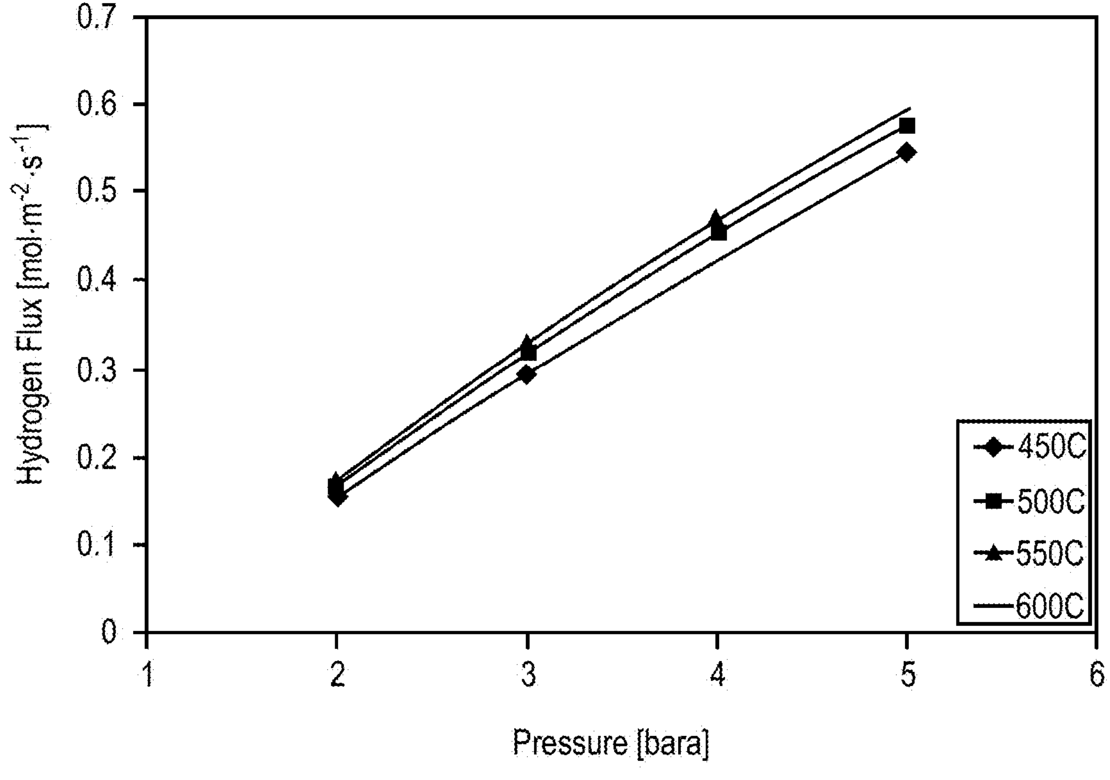
FIG. 12 shows a plot of hydrogen flux as a function of feed pressure and temperature.

FIG. 12 shows the hydrogen flux measurement as a function of feed pressure and temperature measured in the laboratory set-up. Applying pure hydrogen as feed, the hydrogen flux increased as a function of the feed pressure and temperature, obtaining up to 0.6 mol/(m2·s), indicating that both the membrane and seal adapter function well.

EMBODIMENTS

1. A system including:

a first metal header including a bore;

a first header seal including a bore;

a zirconia toughened alumina (ZTA) header including a first bore, a first socket in fluid communication with the first bore, and a first sealing stem;

a first face seal including a bore; and a first ceramic component including a bore and a glazed section on a surface of a first end of the first ceramic component, wherein:

the glazed section includes a member selected from the group consisting of a glass glaze and a glass-ceramic glaze;

the first header seal is disposed in the bore of the first metal header;

the first sealing stem of the ZTA header is disposed in the bore of the first metal header;

the first header seal seals the first metal header to the ZTA header;

a portion of the first end of the first ceramic component is disposed in the first socket of the ZTA header;

the first face seal contacts an inner surface of the ZTA header and the glazed section of the first ceramic component and seals the first ceramic component to the ZTA header; and an interior space of the first ceramic component, an interior space of the ZTA header, and an interior space of the first metal header are in fluid communication.

2. The system of embodiment 1, wherein the glazed section of the first ceramic component is on an external surface of the first end of the first ceramic component.

3. The system of embodiment 1 or 2, wherein the glazed section includes a member selected from the group consisting of CaO-Al2O3-SiO2, CaO—MgO-Al2O3-SiO2, CaO—BaO-Al2O3-SiO2, CaO—ZnO—SiO2, BaO-Al2O3-SiO2-B2O3, BaO-Y2O3-SiO2-B2O3, BaO-Al2O3-SiO2-B2O3 and CaO-La2O3-SiO2-B2O3.

4. The system of any one of embodiments 1-3, wherein the glazed section has a thickness of from 1 μm to 100 μm.

5. The system of any one of embodiments 1-4, further including a coating on an external surface of the first ceramic component, wherein the coating includes a member selected from the group consisting of palladium and a palladium alloy.

6. The system of embodiment 5, wherein:

the glazed section of the first ceramic component is on an external surface of the first end of the first ceramic component; and the coating at least partially covers a surface of the glazed section.

7. A system including:

a first metal header including a bore;

a first header seal including a bore;

a zirconia toughened alumina (ZTA) header including a first bore and a first sealing stem;

a multi-socket manifold base including a first socket and a second socket different from the first socket;

a first face seal including a bore;

a second face seal including a bore;

a first ceramic component including a bore and a glazed section on a surface of a first end of the first ceramic component; and a second ceramic component including a bore and a glazed section on a surface of a first end of the second ceramic component, wherein:

the glazed section of the first ceramic component and the second ceramic component includes a member selected from the group consisting of a glass glaze and a glass-ceramic glaze;

the first header seal is disposed in the bore of the first metal header;

the first sealing stem of the ZTA header is disposed in the bore of the first metal header;

the first header seal seals the first metal header to the ZTA header;

the multi-socket manifold base contacts the ZTA header;

a portion of the first end of the first ceramic component is disposed in the first socket of the multi-socket manifold base;

a portion of the first end of the second ceramic component is disposed in the second socket of the multi-socket manifold base;

the first face seal contacts an inner surface of the first socket and the glazed section of the first ceramic component and seals the first ceramic component to the multi-socket manifold base;

the second face seal contacts an inner surface of the second socket and the glazed section of the second ceramic component and seals the second ceramic component to the multi-socket manifold base;

an interior space of the first ceramic component, an interior space of the ZTA header, and an interior space of the first metal header are in fluid communication; and an interior space of the second ceramic component, an interior space of the ZTA header, and an interior space of the first metal header are in fluid communication.

8. The system of embodiment 7, wherein:

the glazed section of the first ceramic component is on an external surface of the first end of the first ceramic component; and the glazed section of the second ceramic component is on an external surface of the first end of the second ceramic component.

9. The system of embodiment 7 or 8, wherein the glazed section includes a member selected from the group consisting of CaO-Al2O3-SiO2, CaO—MgO-Al2O3-SiO2, CaO—BaO-Al2O3-SiO2, CaO—ZnO—SiO2, BaO—Al2O3-SiO2-B2O3, BaO-Y2O3-SiO2-B2O3, BaO-Al2O3-SiO2-B2O3 and CaO-La2O3-SiO2-B2O3.

10. The system of any one of embodiments 7-9, wherein the glazed section has a thickness of from 1 μm to 100 μm.

11. The system of any one of embodiments 7-10, further including a coating disposed on an external surface of the first ceramic component and on an external surface of the second ceramic component, wherein the coating includes a member selected from the group consisting of palladium and a palladium alloy.

12. A system including:

a first metal header including a bore;

a first header seal including a bore;

a zirconia toughened alumina (ZTA) header including a first bore and a first sealing stem;

a flow-through plate including a plurality of holes;

a flow separator plate including a first plurality of holes and a plurality of diagonal grooves including a second plurality of holes different from the first plurality of holes; and a multi-channel monolith including a plurality of channels;

wherein:

the first header seal is disposed in the bore of the first metal header;

the first sealing stem of the ZTA header is disposed in the bore of the first metal header;

the first header seal seals the first metal header to the ZTA header;

the flow-through plate contacts the ZTA header and the flow separator plate;

the flow separator plate contacts the multi-channel monolith;

a first portion of channels of the multi-channel monolith, the first plurality of the holes of the flow separator plate, the plurality of the holes of the flow-through plate, an interior space of the ZTA header, and an interior space of the first metal header are in fluid communication; and a second portion of the channels of the multi-channel monolith different from the first portion of channels and the second plurality of holes in the grooves of the flow separator plate are in fluid communication.

13. The system of embodiment 12, wherein an end of the multi-channel monolith that contacts the flow separator plate includes a glazed section including a member selected from the group consisting of a glass glaze and a glass-ceramic glaze.

14. The system of embodiment 13, wherein the glazed section includes a member selected from the group consisting of CaO-Al2O3-SiO2, CaO—MgO-Al2O3-SiO2, CaO—BaO-Al2O3-SiO2, CaO—ZnO—SiO2, BaO-Al2O3-SiO2-B2O3, BaO-Y2O3-SiO2-B2O3, BaO-Al2O3-SiO2-B2O3 and CaO-La2O3-SiO2-B2O3.

15. The system of embodiment 13 or 14, wherein the glazed section has a thickness of from 1 μm to 100 μm.

16. The system of any one of embodiments 12-15, wherein:

a coating is disposed on internal surfaces of the first plurality of channels of the multi-channel monolith, and the coating includes a member selected from the group consisting of palladium and a palladium alloy; or a coating is disposed on internal surfaces of the second plurality of channels of the multi-channel monolith, and the coating includes a member selected from the group consisting of palladium and a palladium alloy.

17. A system including:

a first metal header including a bore;

a first header seal including a bore;

a second metal header including a bore;

a second header seal including a bore;

a zirconia toughened alumina (ZTA) header including:

a first bore and a first sealing stem;

a second bore and a second sealing stem; and a divider that defines a first chamber in fluid communication with the first bore and a second chamber different from the first chamber in fluid communication with the second bore;

a flow-through plate including a first plurality of holes and a second plurality of holes different from the first plurality of holes;

a first flow separator plate including a first plurality of holes and a plurality of diagonal grooves including a second plurality of holes different from the first plurality of holes;

a second flow separator plate including a first plurality of holes and a plurality of diagonal grooves including a second plurality of holes different from the first plurality of holes; and a multi-channel monolith including a plurality of channels;

wherein:

the first header seal is disposed in the bore of the first metal header;

the first sealing stem of the ZTA header is disposed in the bore of the first metal header;

the first header seal seals the first metal header to the ZTA header;

the second header seal is disposed in the bore of the second metal header;

the second sealing stem of the ZTA header is disposed in the bore of the second metal header;

the second header seal seals the second metal header to the ZTA header;

the flow-through plate contacts the ZTA header and the first flow separator plate;

the second flow separator plate contacts the first flow separator plate and the multi-channel monolith;

a first portion of channels of the multi-channel monolith, the first plurality of the holes of the second flow separator plate, the second plurality of holes in the grooves of the first flow separator plate, the first plurality of holes of the flow-through plate, the first chamber, and an interior space of the first metal header are in fluid communication; and a second portion of the channels of the multi-channel monolith different from the first portion of channels, the second plurality of the holes in the grooves of the second flow separator plate, the first plurality of holes of the first flow separator plate, the second plurality of holes of the flow-through plate, the second chamber, and an interior space of the second metal header are in fluid communication.

18. The system of embodiment 17, wherein:

a coating is disposed on internal surfaces of the first plurality of channels of the multi-channel monolith, and the coating includes a member selected from the group consisting of palladium and a palladium alloy; or a coating is disposed on internal surfaces of the second plurality of channels of the multi-channel monolith, and the coating includes a member selected from the group consisting of palladium and a palladium alloy.

19. The system of embodiment 17 or 18, wherein an end of the multi-channel monolith that contacts the second flow separator plate includes a glazed section including a member selected from the group consisting of a glass glaze and a glass-ceramic glaze.

20. The system of embodiment 19, wherein the glazed section includes a member selected from the group consisting of CaO-Al2O3-SiO2, CaO—MgO-Al2O3-SiO2, CaO—BaO-Al2O3-SiO2, CaO—ZnO—SiO2, BaO-Al2O3-SiO2-B2O3, BaO-Y2O3-SiO2-B2O3, BaO-Al2O3-SiO2-B2O3 and CaO-La2O3-SiO2-B2O3.

21. The system of embodiment 19 or 20, wherein the glazed section has a thickness of from 1 μm to 100 μm.

What is claimed:

1. A system comprising:

a first metal header comprising a bore;

a first header seal comprising a bore;

a zirconia toughened alumina (ZTA) header comprising a first bore, a first socket in fluid communication with the first bore, and a first sealing stem;

a first face seal comprising a bore; and a first ceramic component comprising a bore and a glazed section on a surface of a first end of the first ceramic component, wherein:

the glazed section comprises a member selected from the group consisting of a glass glaze and a glass-ceramic glaze;

the first header seal is disposed in the bore of the first metal header;

the first sealing stem of the ZTA header is disposed in the bore of the first metal header;

the first header seal seals the first metal header to the ZTA header;

a portion of the first end of the first ceramic component is disposed in the first socket of the ZTA header;

the first face seal contacts an inner surface of the ZTA header and the glazed section of the first ceramic component and seals the first ceramic component to the ZTA header; and an interior space of the first ceramic component, an interior space of the ZTA header, and an interior space of the first metal header are in fluid communication.

2. The system of claim 1, wherein the glazed section of the first ceramic component is on an external surface of the first end of the first ceramic component.

3. The system of claim 1, wherein the glazed section comprises a member selected from the group consisting of $CaO—Al_2O_3—SiO_2$, $CaO—MgO—Al_2O_3—SiO_2$, $CaO—BaO—Al_2O_3—SiO_2$, $CaO—ZnO—SiO_2$, $BaO—Al_2O_3—SiO_2—B_2O_3$, $BaO—Y_2O_3—SiO_2—B_2O_3$, $BaO—Al_2O_3—SiO_2—B_2O_3$ and $CaO—La_2O_3—SiO_2—B_2O_3$.

4. The system of claim 1, wherein the glazed section has a thickness of from 1 μm to 100 μm.

5. The system of claim 1, further comprising a coating on an external surface of the first ceramic component, wherein the coating comprises a member selected from the group consisting of palladium and a palladium alloy.

6. The system of claim 5, wherein:

the glazed section of the first ceramic component is on an external surface of the first end of the first ceramic component; and the coating at least partially covers a surface of the glazed section.

* * * * *